United States Patent [19]
Franaszek

[11] 4,052,704
[45] Oct. 4, 1977

[54] APPARATUS FOR REORDERING THE SEQUENCE OF DATA STORED IN A SERIAL MEMORY

[75] Inventor: Peter Anthony Franaszek, Ossining, N.Y.

[73] Assignee: International Business Machines Corporation, Armonk, N.Y.

[21] Appl. No.: 752,752

[22] Filed: Dec. 20, 1976

[51] Int. Cl.² .................. G06F 7/04; G11C 19/00
[52] U.S. Cl. ........................ 364/900; 340/174 SR
[58] Field of Search ............ 340/172.5, 174 SR; 445/1

[56] References Cited

U.S. PATENT DOCUMENTS

| | | | |
|---|---|---|---|
| 3,302,186 | 1/1967 | Raser et al. | 340/172.5 |
| 3,310,782 | 3/1967 | Sinn et al. | 340/172.5 |
| 3,704,452 | 11/1972 | Beausoleil et al. | 340/172.5 |
| 3,766,534 | 10/1973 | Beausoleil et al. | 340/172.5 |
| 3,797,002 | 3/1974 | Brown et al. | 340/174 SR |

*Primary Examiner*—Harvey E. Springborn
*Attorney, Agent, or Firm*—Robert E. Sandt

[57] ABSTRACT

This memory management system provides an improved search logic for locating pages of data stored parallel-by-bit, serially-by-page in a shift register memory and for moving those pages to a position at the head of the file. Searching alternates between forward and reverse with a first direction change occurring when the head of the file occupies an input/output station in the memory and a second change occurring when the last of a plurality of pages identified for search at the first reversal position is found.

The page numbers of three sought data pages are entered into three search registers and compared with the page number of each page as it is shifted into the input/output station of the memory. A page number is replaced when the page is found. Page numbers are marked with a binary one upon each direction change at the first position and with a binary zero at each replacement of a page number at other than that position.

The data loop includes four parking registers which may be selectively excluded from the loop so as to park the successive pages as they are found in the search. As a reverse feeding moves the head of the file proximate to the input/output station, the pages stored in the parking registers are inserted into the data stream at the head of the file.

8 Claims, 22 Drawing Figures

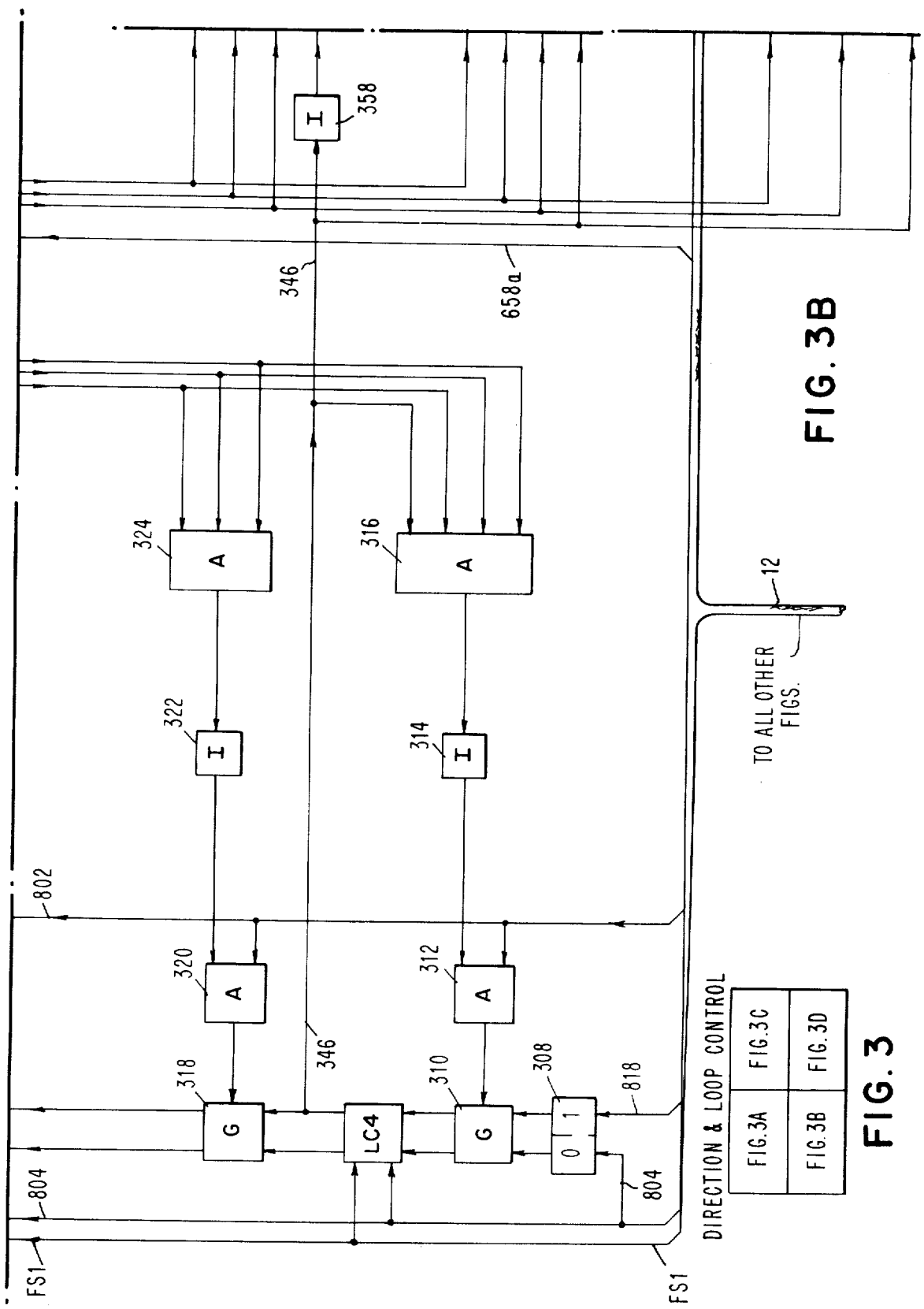

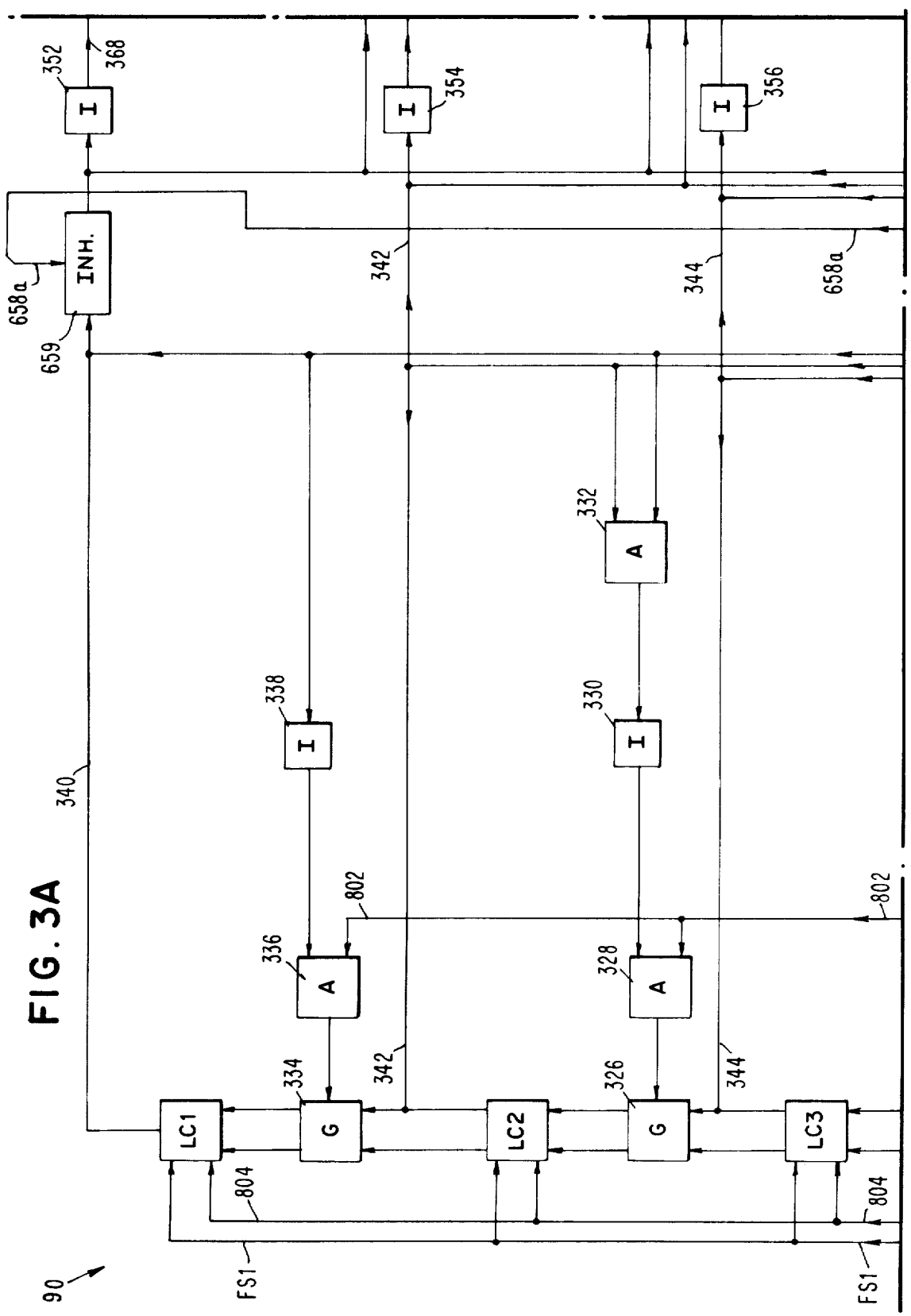

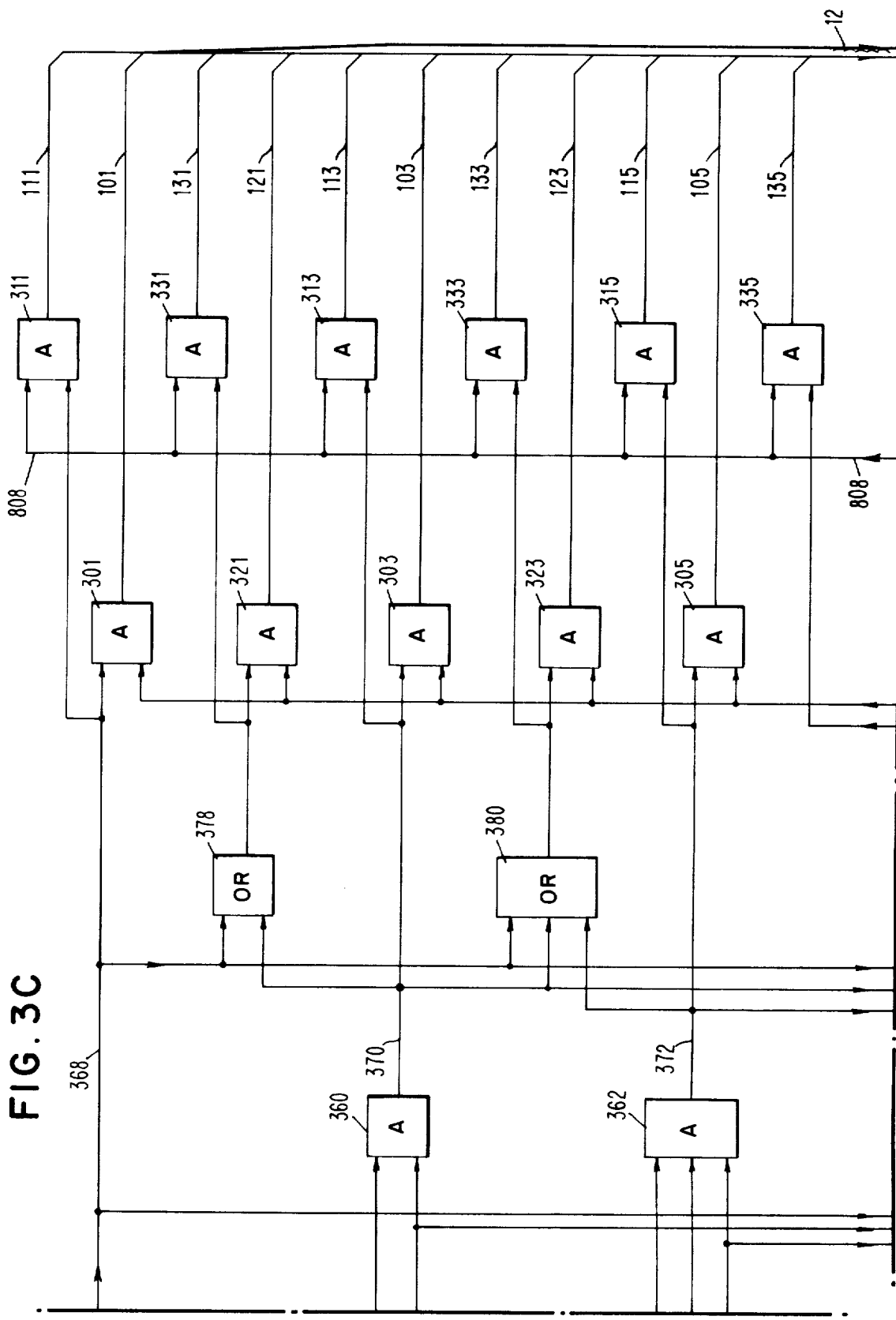

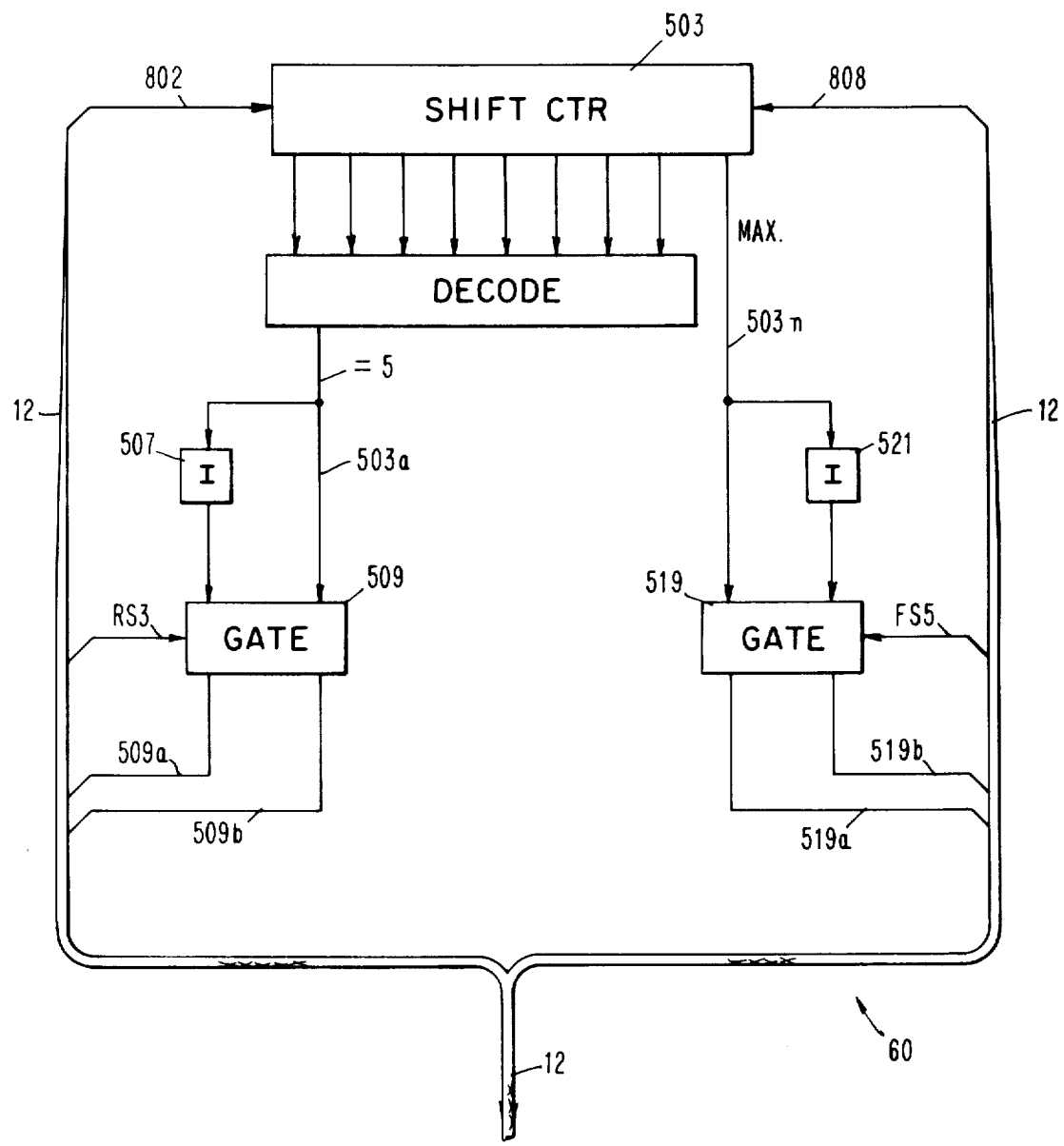
(SHIFT COUNTER) FIG. 4

INTERROGATION UNIT

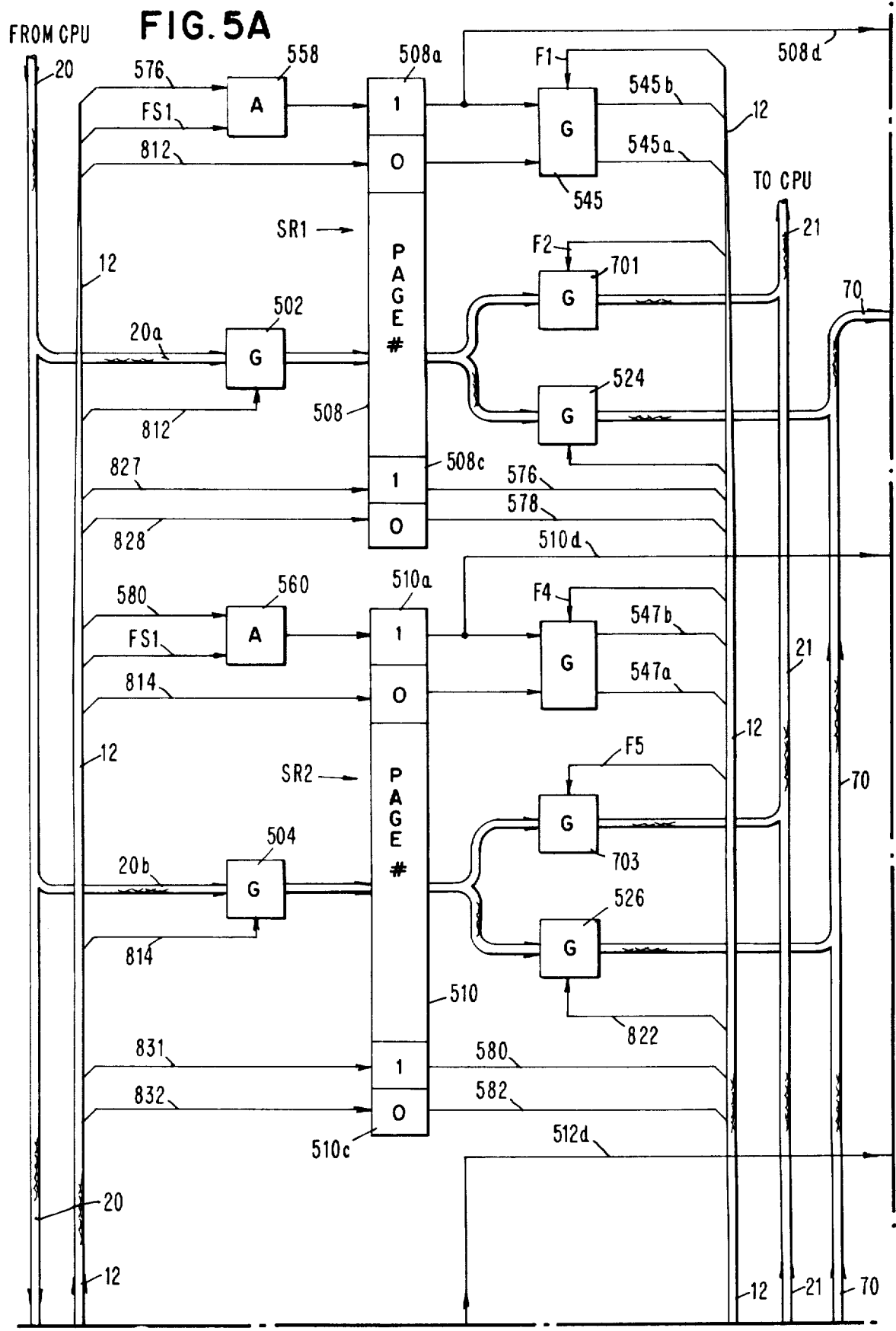

TIMING CONTROLS

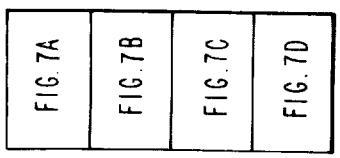
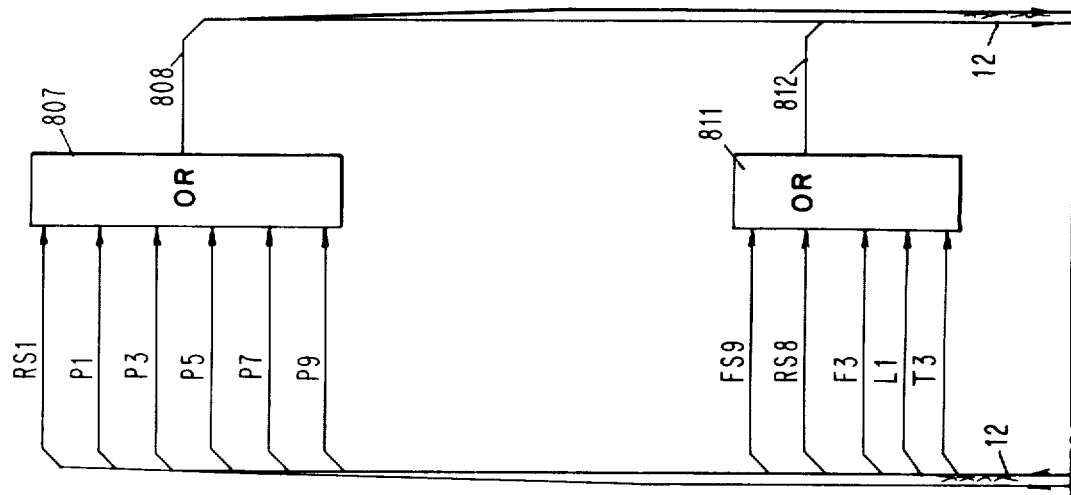
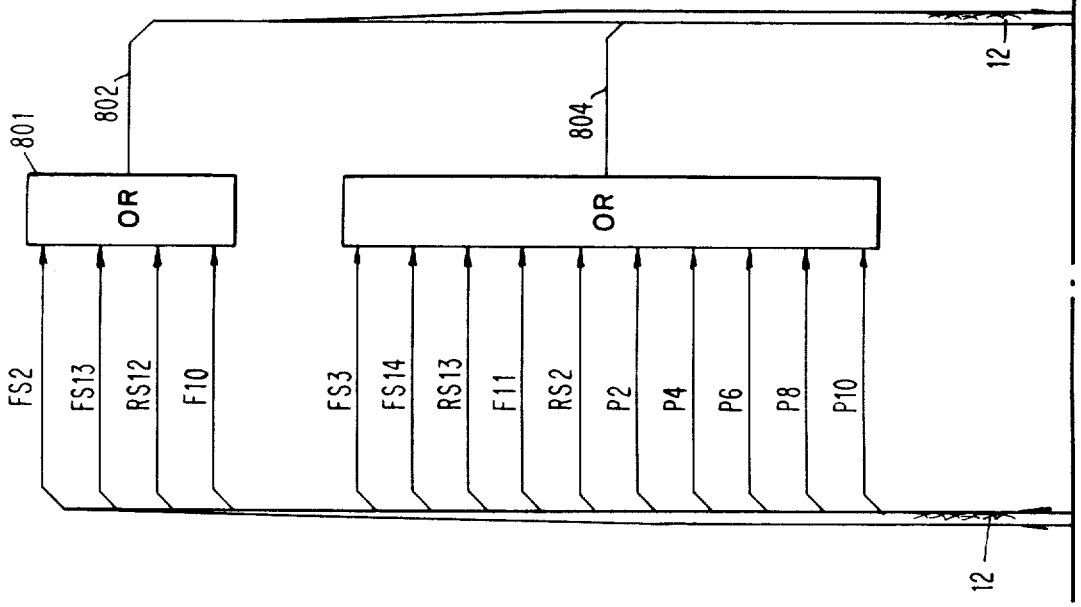

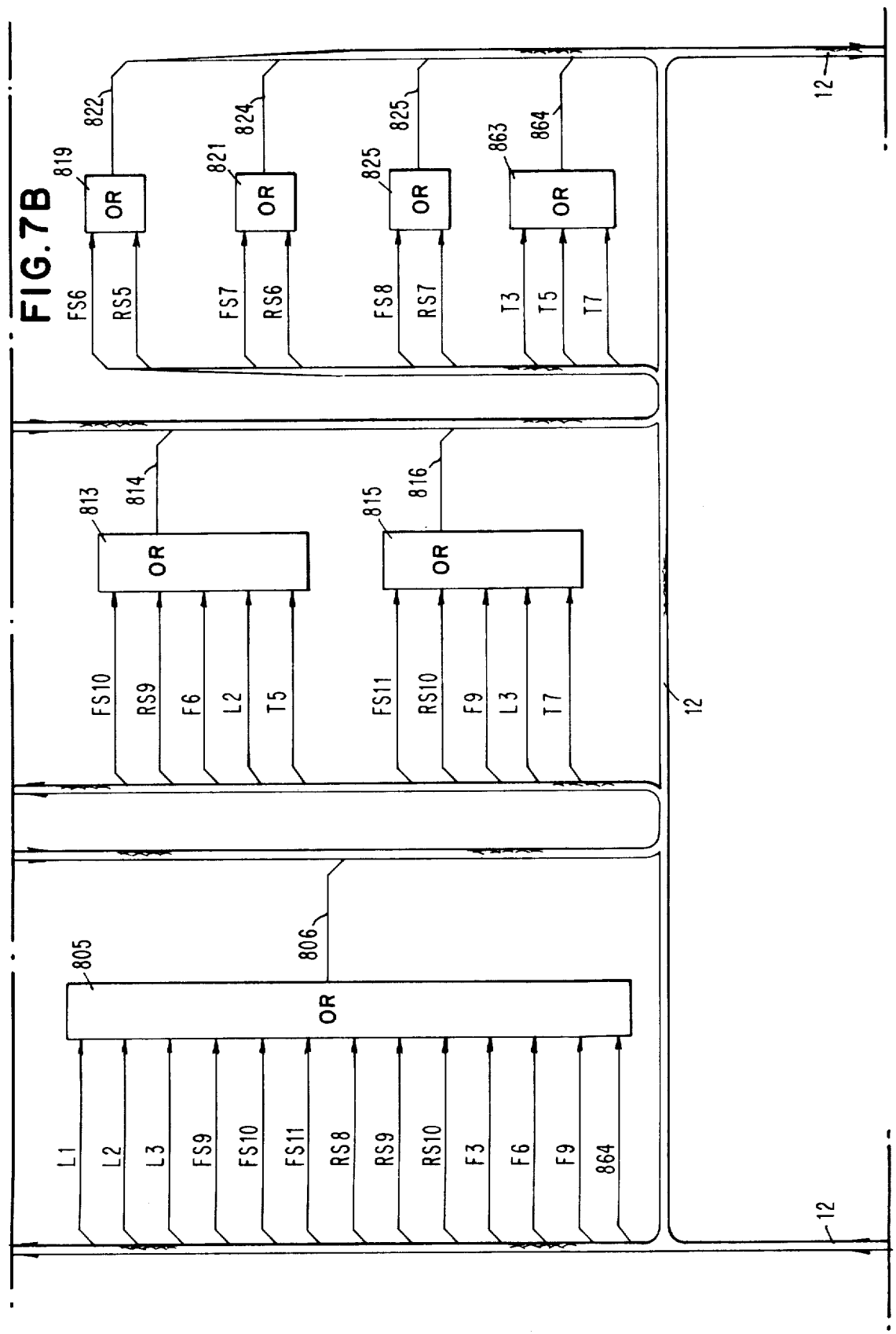

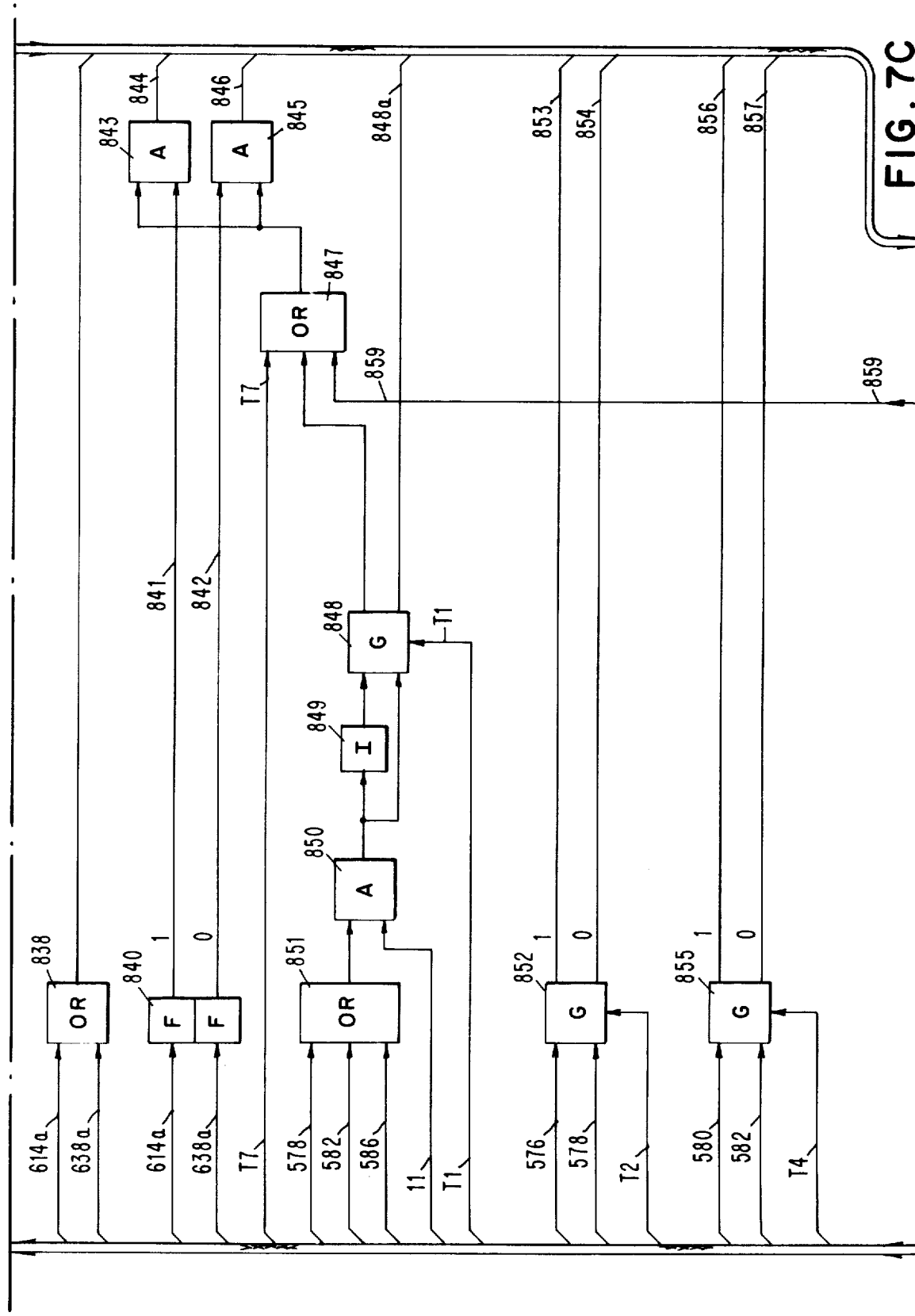

APPARATUS FOR REORDERING THE SEQUENCE OF DATA STORED IN A SERIAL MEMORY

BACKGROUND OF THE INVENTION

This invention relates to memory management systems, and more particularly, to apparatus for reordering the sequence of data in a serial shift register type of memory.

Historically, in any serial type of memory, as for example a magnetic tape, it was necessary to examine each item of data serially until the desired item was found. To reduce this access time, many schemes were devised. The magnetic drum with multiple tracks and access heads was one such solution. The random access magnetic disc storage device was another.

Other prior art workers have sought a solution through data management. This broad class seeks to predict the future requirements for access to the data and group together in close proximity those items which are most likely to be required. One criterion for the rearrangement of data is to promote the most recently accessed data to the head of the file. The instant invention constitutes an improvement upon that basic concept.

It is to this latter class of solutions that the instant invention is directed. While, as will be discussed, other prior art memory management systems have promoted the most recently accessed data sets to the head of the file as is done in the instant apparatus, none of them strives to optimize the searching procedure itself to find the sought data to promote to the head of the file.

The invention is generic to any serial type of memory where the data sets are serially shifted, parallel-by-bit, into at least one access station in either a forward or reverse direction of feed. Memories of this type include cascaded bi-stable shift register stages or a so-called bubble memory. Both types are represented in the art now to be discussed.

A serial memory data reordering scheme employing a magnetic bubble memory is described by Beausoleil et al in an article entitled, "Magnetic Bubble Organization," published in the IBM Journal Of Research and Development for November 1972, beginning at page 587. In that publication and in the patents to be hereinafter cited, reordering is effected by shifting in the forward direction until the sought page resides in the input/output station where it is read out to the CPU or other utilization device. The data is then reverse shifted in a loop shortened by one stage, leaving the found page the I/O station. When the head of the file is reached, the I/O station is included in the loop to promote the found page to the head of the file. Searching is then resumed until the next page is found.

In another embodiment, Beausoleil et al describe a double ordering scheme where the odd pages are shifted to the front of the file and the even pages to the rear of the file, with searching proceeding in opposite directions for the odd and even pages. The least recently used pages occupy the center of the file.

In yet another scheme, the publication describes a two-dimensional scheme. Here, in addition to a vertical shift in either a long or short loop, the pages can be shifter laterally betweem the I/O stations in either a short or long loop.

The work of others in the field is represented by the following patents:
 a. U.S. Pat. No. 3,701,132 issued Oct. 24, 1972 to Bonyhard et al and assigned to Bell Telephone Laboratories, Inc.
 b. U.S. Pat. No. 3,737,881 issued June 5, 1973 to Cordi et al and assigned to the IBM Corporation.
 c. U.S. Pat. No. 3,704,452 issued Nov. 28, 1972 to Beausoleil et al and assigned to IBM Corporation.
 d. U.S. Pat. No. 3,766,534 issued Oct. 16, 1973 to Beausoleil et al and assigned to the IBM Corporation.
 e. U.S. Pat. No. 3,797,002 issued Mar. 12, 1974 to David T. Bowen and assigned to IBM Corporation.

All of the foregoing patents and the publication enjoy the common feature of promoting the most recently accessed data to a preferred position at the head of the file. In the simplest scheme, the data is circulated past a read station until the desired page is found. It is then parked at the read station while the direction of shifting is reversed to bring the head of the file adjacent the read station where the "found" item of data is fed into the stream of data at the head of the file. A counter is usually employed to keep track of the shifts.

In another scheme, the even-numbered pages are promoted to the head of the file and the odd-numbered pages are reordered at the end of the file in accordance with their use. This, effectively, halves the average access time.

Other double ordering schemes are described by Beausoleil et al in the U.S. Pat. No. 3,766,534 patent and by Bonyhard et al in the U.S. Pat. No. 3,701,132 patent supra.

The instant invention constitutes an improvement of the data management systems represented in the foregoing art in these respects:
 1. The search is bidirectional.
 2. A plurality of data sets are searched during each direction of a search.
 3. As a data set is found, its search query is replaced by another.
 4. Provision is made for diverting a plurality of data sets found during the search for reordering at the head of the file.
 5. The direction of search proceeds in a first direction of search until all of the data sets identified for search at the head of the file have been found.

It is therefore an object of this invention to provide an improved data management system for reordering the sequence of the data sets in a serial shift register type of memory.

A further object is to provide a system in accordance with the first object wherein the data in memory is seriately examined at a search station for conformity with any one of a plurality of search criteria during each of two directions of search, another criterion being substituted for one found during either direction of search, the found data sets being relocated to a position at the head of the file, and reversals of the direction of search occurring when the head of the file occupies the search station and when all of the search criteria then existing have been satisfied.

The foregoing and other objects, features, and advantages of the present invention will be apparent from the following more particular description of a preferred embodiment of the invention as illustrated in the accompanying drawings.

BRIEF DESCRIPTION OF THE DRAWINGS

FIG. 4 shows the details of the shift counter.

SUMMARY OF OPERATION

Figure 1:
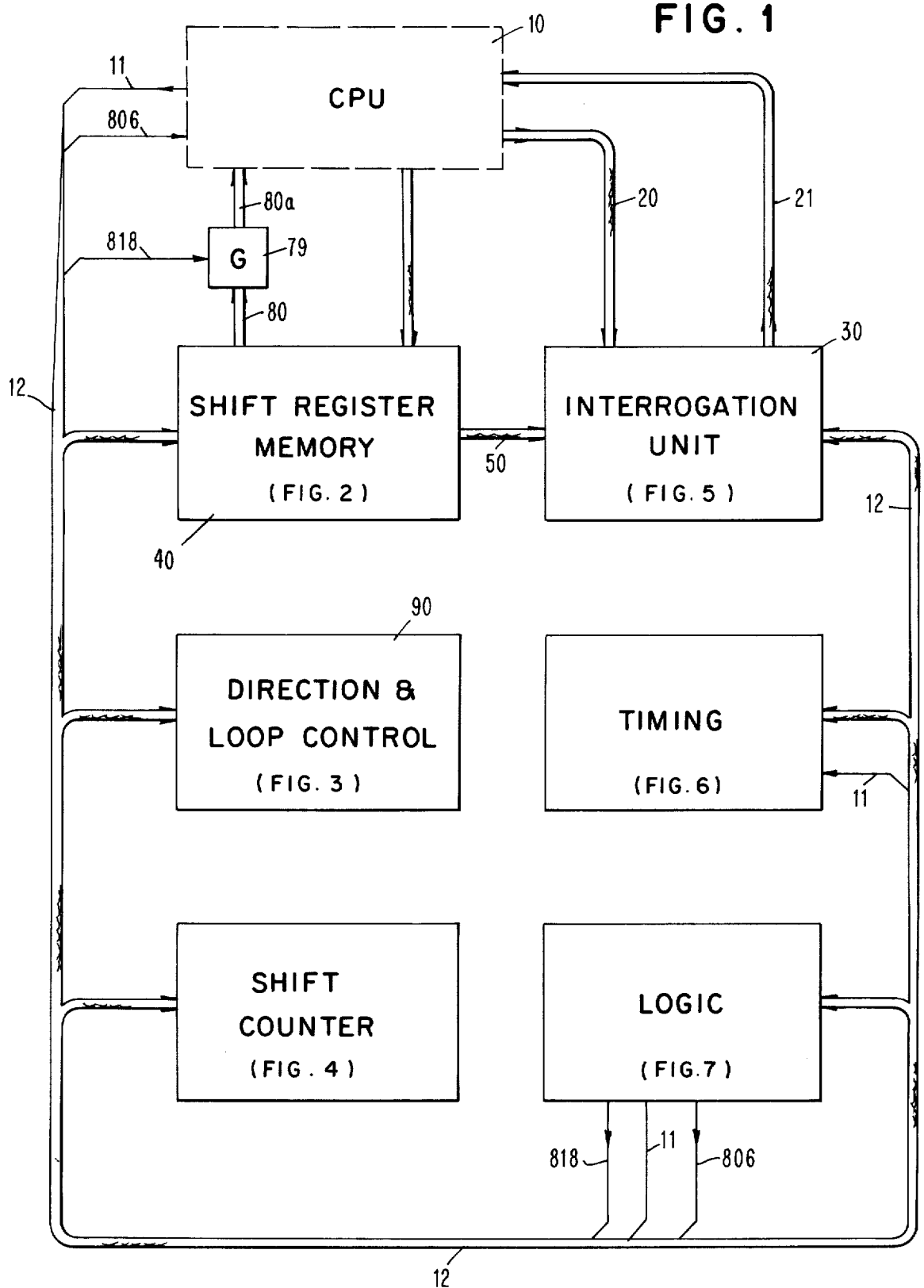
FIG. 1 is a functional block diagram of the invention.

The overall block diagram of FIG. 1 shows the interconnection of the major functional components. Necessarily any memory system is subservient to the commands of a central processing unit 10 from which it receives demands for specified pages of data or from which it receives commands to update or replace specified pages of data. In any serial storage system wherein the sequence of data storage is to be reordered in accordance with some function of the usage of the data, access to the data must be by means of a descriptor or other identification number. For ease of reference memory access will be controlled by a page number which is generated by controls within the CPU 10.

The page numbers are entered into an interrogation unit 30 via cable 20 whenever the CPU has pages awaiting access and the unit 30 has space available. As will be seen the interrogation unit has the capacity for three page numbers for which it searches simultaneously. As soon as a page is located and made accessible to the CPU, a new page number is added to the unit 30 so that it can always have a queue of page numbers upon which it is operating.

The shift register memory 40 may take any of several forms including a bubble memory where magnetic bubbles manifesting binary ones or zones are shifted in various controlled loops and can be sensed or altered at a read/write station. The shift register memory must, however, consist of a plurality of synchronously shifted orders wherein a corresponding bit from each of the stored words is stored in the same ordered shift register, and any one shift register contains the same corresponding bit from all the words.

Thus, if there were a 1024 bit word, there would be 1024 individual shift registers each with as many stages or bit positions as there are words to be stored. The shift register memory must also be able to shift data in both directios and include a station where the data can be read or new data written thereinto in parallel.

A final feature of the shift register memory which must be included is a so called parking register or siding wherein those pages which have been found in a search may be parked while the other data pass it on the main line to permit reordering the sequence of the data. In the instant embodiment there are four parking registers and five different loops for data ordering.

As each page is shifted into the input/output station of the shift register memory 40 the page number is delivered via cable 50 to the compare unit 60 to which the page numbers in the search register 30 are entered via cable 70 for comparison therewith. If no comparison is found the next page is shifted into the input/output station until a match is found. The matching page is read out to the CPU 10 via cable 80 by means of gate 79 opened by one of two timing pulses on line 818.

The thus-found word is then shifted into one of the parking registers for retention until the head of the file approaches the input/output station so that all "found" words may be promoted to the head of the file.

The direction and loop control logic circuitry 90 controls the gating of data into and out of the parking registers for reordering the page sequence to promote the most recently found pages to the head of the file, and determines the direction of search in accordance with the following rules:

A. A forward search always begins when the head of the file is at the input/output station and there are pages present for search.

B. A forward search continues until one of the following conditions occurs:
1. All of the pages residing in the search register when the head of the file was at the I/O station have been found; or
2. The parking registers are full; or
3. The end of the file is reached;

C. Reverse searching is initiated upon termination of forward searching and ceases when the head of the file is reached, except if the parking registers are full.

D. Forward and reverse movements may be effected to move found pages into the parking registers and to shift the main body of the file in the main line to a position to switch the "found" pages from the parking registers to a position at the head of the loop.

The loop and direction control logic circuitry effects the foregoing by adding a "1" marker bit to all page numbers in the search unit 30 at the head of the file and a "0" marker bit to any page number entered thereinto at any other time. Search continues forward until all the pages in the search register 30 have "0" marker bits, or one of the other conditions occurs.

The loop and direction control circuitry 90 also contains a match counter which stops the searching when the number of "found" pages equals the capacity of the parking registers, which in the present embodiment equals four. The circuits also include a shift counter which is incremented or decremented in synchronism with the forward and reverse shifting of the shift register memory 40. This counter will always register zero when the head of the file (page 0) resides in the input/output station and will overflow when the bottom of the file is reached. Finally a special form of shift register is used to keep track of the movement of "found" pages in the parking registers. This opens the various gates to gate data into and out of the parking registers to await the head of the file.

Timing circuits, provide the sequence of impulses to synchronize the respective operations and provide the various alternative branching sequences.

DETAILED OPERATION

Memory

Figure 2:
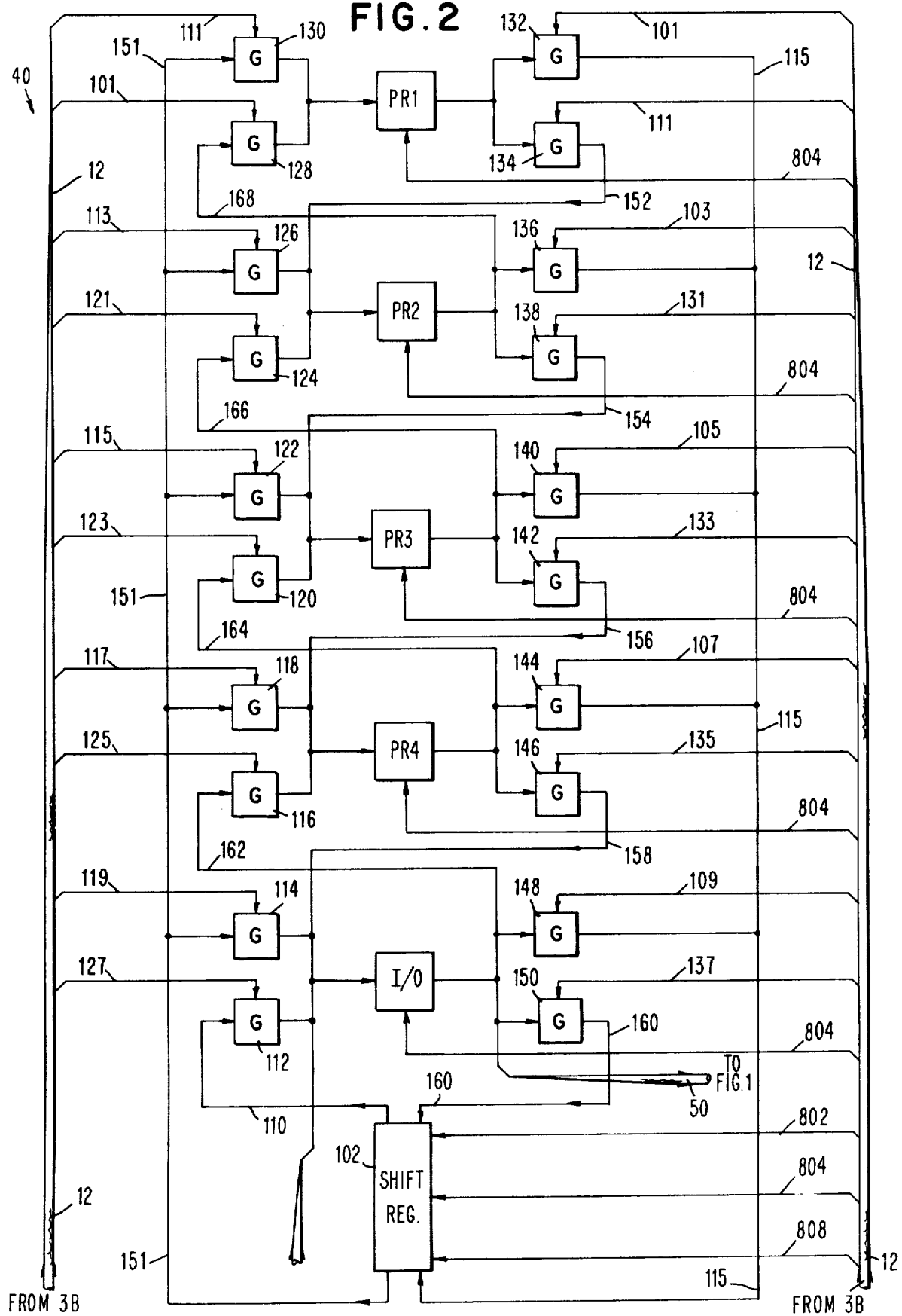
FIG. 2 is a single bit position of the shift register memory.
Figure 3D:
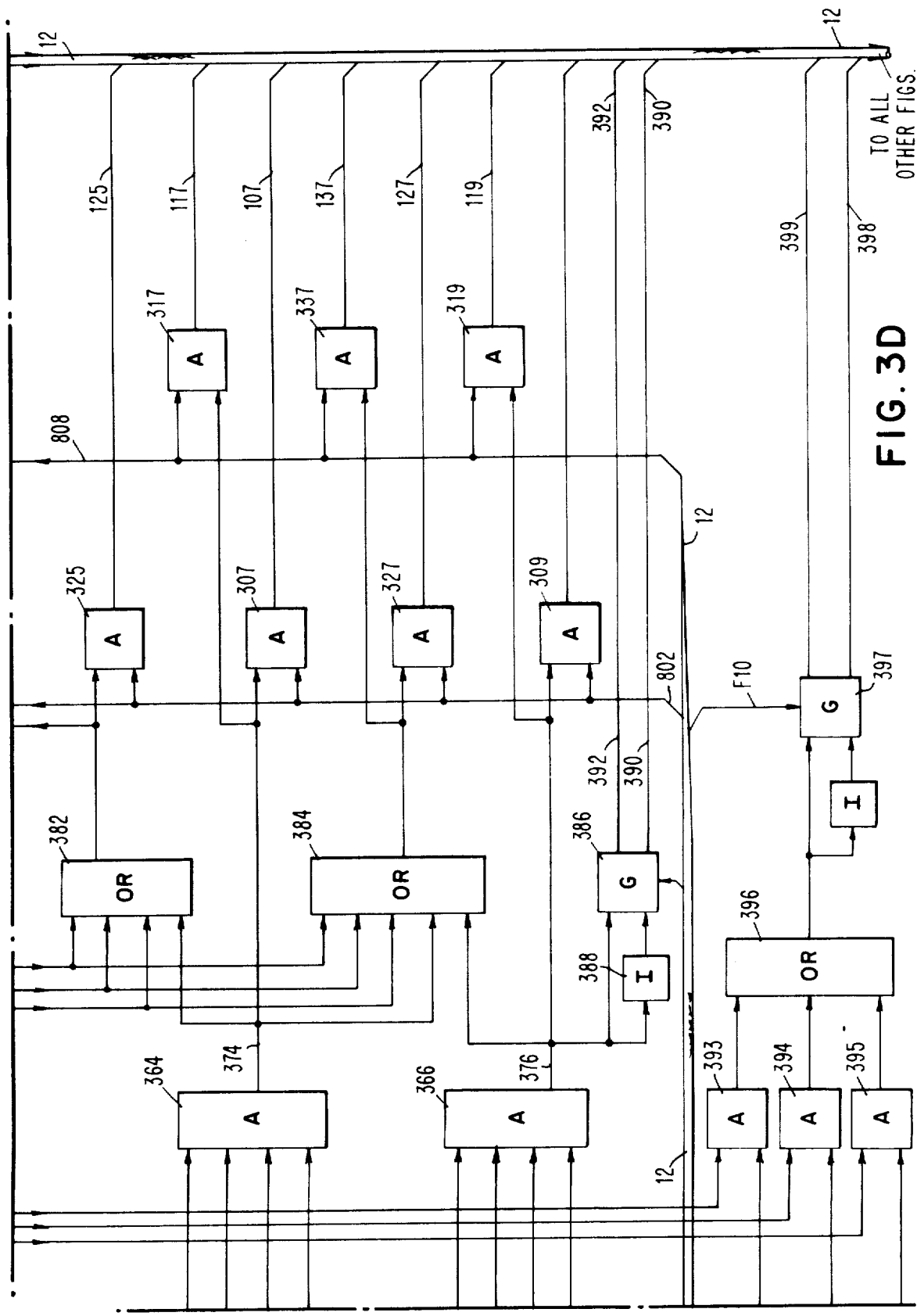
FIG. 3, consisting of FIGS. 3A, 3B, 3C, and 3D, gives the details of the direction and loop control circuitry.

The shift register memory 40 of FIG. 1 is shown in greater detail in FIG. 2 of which one order only one of a multi order shift register memory has been illustrated. It is to be understood that the apparatus of FIG. 2 would be replicated in as many orders as there are bits in a memory word. For simplicity only one order has been shown. Each order of the shift register memory consists of a multi-stage conventional shift register 102 consisting of a pair of flip-flops with a gate between them to transfer the bit from one to another and interstage gates for shifting a bit in a forward or reverse direction. Internal, or intrastage shifting is effected by means of a control pulse on line 804. Forward interstage shifting is controlled by a pulse on line 802, and reverse shifting by means of line 808.

When data is being shifted forward it progresses upwardly as seen in FIG. 2 so that the binary bit on line 110 from the shift register 102 is made available to the input/output station I/O if gate 112 is opened. Since shifting is a closed loop operation, the shift register 102 must receive a bit at the other end via wire 115. It is noted that wire 115 can receive a bit from any one of the parking registers PR1, PR2, PR3, PR4 or from the I/O station for a possibility of five different loops. The I/O station and shift register 102 must always be in the loop. The loop can also include PR1; or PR1 & PR2; or PR1 & PR3; or PR1 & PR2 & PR3 & PR4.

When data is shifted in the reverse direction (downward) a bit exits from shift register 102 at the bottom on line 151 and can be gated to the I/O station, PR4, PR3, PR2, or PR1. If a bit is gated to PR1 for example, the bits in PR2, PR3, PR4, and I/O must also be shifted. The various loops and the gate status can best be explained by reference to the following table.

register will not be loaded in the forward search operation. Loop D, and in fact, Loop E will not be used. These gates are active to control the data flow in the other loops and are available in a more general application for extracting words from the parking register individually.

If one assumes that reversing occurs when three pages have been found and parked, then one more page can be found in the reverse search direction, or as many pages as there may be parking registers left, if the parking capacity is expanded. In the purely general case, if no pages were found in the forward search, possibly if none of the pages is in memory, then the reverse search would employ loop F. One page parked in a forward search would follow Loop G in the reverse search, two Loop H, three Loop I, and four pages Loop J. In fact Loop J will be followed when in a forward and reverse search the parking registers are filled and the data is shifted in Loop J until the head of the stack is in the last stage of the shift register 102. Path F is then opened to shift the four "found" pages into the shift register 102 followed by the head of the stack page (page zero for convenience) at the I/O station.

It is to be noted that the shift register counter will register zero when page zero is in the I/O station and register a count of 5 when page zero occupies the last stage of the shift register.

TABLE 1

| LOOP | SR102 | | I/O | | PR4 | | PR3 | | PR2 | | PR1 | |
|------|-------|-----|-----|-----|-----|-----|-----|-----|-----|-----|-----|-----|
|      | IN    | OUT | IN  | OUT | IN  | OUT | IN  | OUT | IN  | OUT | IN  | OUT |
| FORWARD SHIFT | | | | | | | | | | | | |
| A    | 115   | 110 | 112 | 162 | 116 | 164 | 120 | 166 | 124 | 168 | 128 | 132 |
| B    | 115   | 110 | 112 | 162 | 116 | 164 | 120 | 166 | 124 | 136 | out of loop | |
| C    | 115   | 110 | 112 | 162 | 116 | 164 | 120 | 140 | out of loop | | out of loop | |
| D    | 115   | 110 | 112 | 162 | 116 | 144 | out of loop | | out of loop | | out of loop | |
| E    | 1     | 110 | 112 | 148 | out of loop | | out of loop | | out of loop | | out of loop | |
| REVERSE SHIFT | | | | | | | | | | | | |
| F    | 160   | 151 | 158 | 150 | 156 | 146 | 154 | 142 | 152 | 138 | 130 | 134 |
| G    | 160   | 151 | 158 | 150 | 156 | 146 | 154 | 142 | 126 | 138 | out of loop | |
| H    | 160   | 151 | 158 | 150 | 156 | 146 | 122 | 142 | out of loop | | out of loop | |
| I    | 160   | 151 | 158 | 150 | 118 | 146 | out of loop | | out of loop | | out of loop | |
| J    | 160   | 151 | 114 | 150 | out of loop | | out of loop | | out of loop | | out of loop | |

From the foregoing table it will be apparent that the following loops include these elements in series Loop A — SR102; I/O; PR4; PR3; PR2; PR1; SR102
Loop B — SR102; I/O; PR4; PR3; PR2; SR102
Loop C — SR102; I/O PR4; PR3; SR102
Loop D — SR102; I/O; PR4; SR102 Loop E — SR102; I/O; SR102
Loop F — SR102; PR1; PR2; PR3; PR4; I/O; SR102
Loop G — SR102; PR2; PR3; PR4; I/O; SR102
Loop H — SR102; PR3; PR4; I/O; SR102
Loop I — SR102; PR4; I/O
Loop J — SR102; I/O; SR102.

When all of the found pages have been promoted to the head of the file and searching starts forward, all pages will be shifted in Loop A. When the first page is found, shifting continues until it occupies parking register PR1. That register is then taken out of the loop and Loop B is activated until the second found page is located in register PR2. Loop C then becomes active until the third page occupies PR3. At this time, since there are only three search registers, all of the pages existing at the top of the file will have been found and the search direction will reverse. Therefore the fourth parking Each one of the lines entering into and exiting from shift register 102, input/output station I/O and the parking registers PR1, PR2, PR3 and PR4 are actually a pair of lines one of which is potentialized to positively manifest a binry zero or binary one. Derivatively all of the gates are two line gates to pass either the binary zero or binary one.

The input/output station and each of the parking registers consist of two bistable flip-flops connected by a two line gate opened by the internal shift pulse on line 104. In a shift register a bit is entered into the first flip-flop at a first time whilst the second flip-flop reads into the next following position. During the second shift time the bit in the first flip-flop is shifted into the second flip-flop.

Each one of the gates denoted by a "G" enclosed in a square box in FIG. 2 is opened by an appropriate impulse on the line exiting from the cables 180a or 180b. These pulses will be described using a typical search operation.

SEARCH REGISTER

The search register, as has been stated has space for three page numbers, although this is a purely arbitrary choice. Expansion beyond this number involves a simple replication of elements and timing impulses.

The page numbers from the CPU are available on cable 20 and branches 20a, 20b, and 20c, each terminating respectively in gates 502, 504, and 506 which when opened by an appropriate timing pulse will enter a page number into the page number portion 508, 510, or 512 of search register SR1, SR2, or SR3. Each of these search registers has an additional bit position 508a, 510a, and 512a into which a binary one is set at the head of the stack and a binary zero when a new page is entered at other then the head of the stack.

The "1" side of each of the registers 508a, 510a, and 512a has an output line 508d, 510d, and 512d connected to a common OR gate 514 (FIG. 5B) which detects whether any one of the page number marker bits remains in the "1" state, a condition which commends the continuation of a forward search. The output of OR 514 is repeatedly tested by opening gate 516 to produce a forward signal on line 520 and a reverse shift signal on line 522. The detailed effect of these signals will be described when a typical search operation is examined.

COMPARE CIRCUITS

Figure 5C:
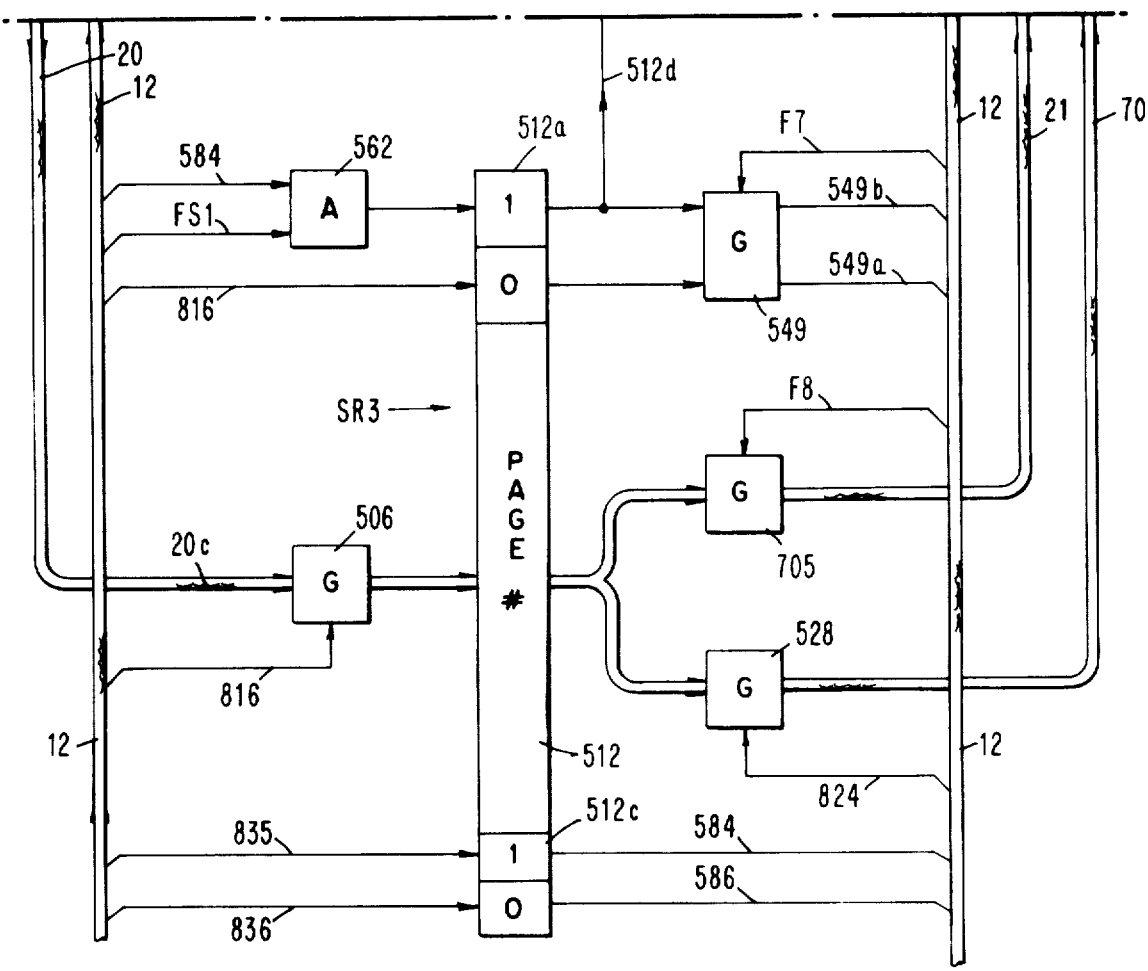
FIG. 5, consisting of FIGS. 5A through 5C, shows the interrogation circuitry.
Figure 5:
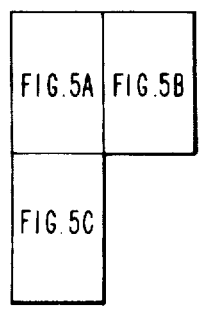
Figure 5B:
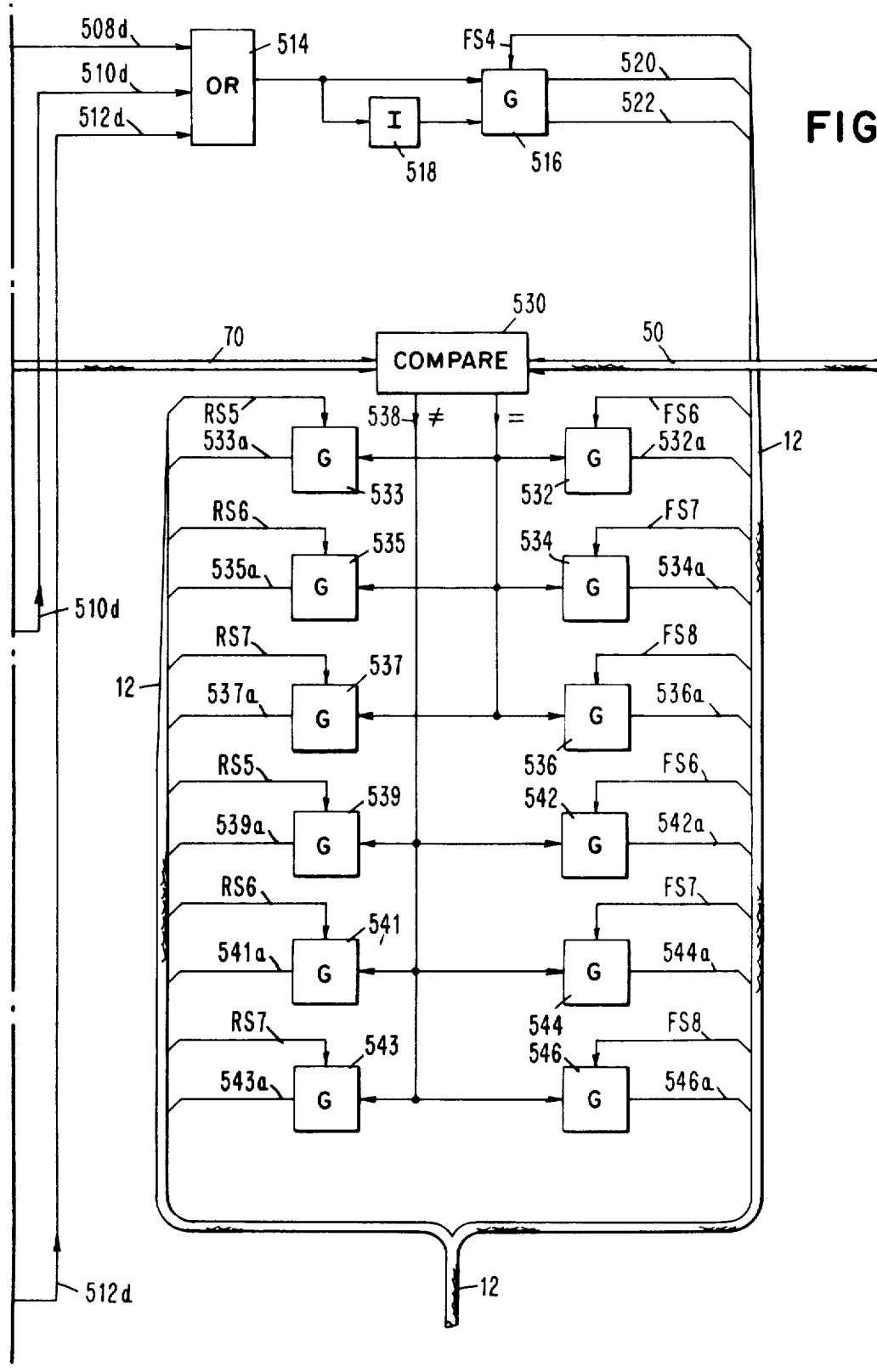

Each page number register (FIG. 5) has an output gate 524, 526, or 528 connecting the respective registers to a common cable 70 to provide one input to a multi-bit comparator 530 (FIG. 5B). The second input to the comparator 530 is derived from the input/output station I/O (FIG. 2) via cable 50, it having been stated that the single order shift register assembly of 50 is replicated for as many bits as exist in any one word. Thus each page number is read at the I/O station and presented for comparison with the page numbers in the three search registers. To prevent conflict each of the page numbers in the search registers is sequentially gated to the comparator by timing pulses on the gates 524, 526 and 528. In the forward search the equals output (=) from comparator 530 is gated out to individual circuits via gates 532, 534, and 536 to control the replacement of page a number in SR1, or SR2, or SR3 respectively. During reverse searching the corresponding gates 533, 535, and 537 perform a comparable function.

The non-match situation is detected on line 538 and distributed during forward searching by gates 542, 544, and 546 and in a reverse search by gates 539, 541, 543. Effectively these gates sequentially test SR1, SR2, and SR3 for a match with the page number at the I/O station and if no match, move a new page into the I/O station.

If, for example, gate 532 produced a match indication, a branch control would reload register SR1 with a new page number. If there were no match, gate 542 would initiate a testing of register SR2. This test opens gates 534 and 544 to produce a match or mismatch signal for SR2. A match reloads register SR2. Finally register SR3 is tested and reloaded if a match occurs. No match shifts into the I/O station. After a match condition and reloading of any one of the search registers a new page is also shifted into the I/O station.

LOOP CONTROL

The various loops through which the page bits can be synchronously shifted into and out of the parking registers have been described with respect to FIG. 2 and Table 1. It should be noted that the forward and reverse bit flows in the various loops are symmetrical, in that the forward loops A, B, C, D, and E have a respective counterpart in the reverse loops F, G, H, I and J.

The loop symmetry is exploited in the loop control circuits of FIGS. 3A to 3D. Here a modified shift register keeps track of the progress of the "found" pages through the parking registers and provides the gate control signals to park the "found" pages and bypass the remaining pages.

Every time a wanted page is found, a binary one is entered into the lowest of the four stages of the loop control register, as that page is shifted in a forward direction from the I/O station, where it was found, to the parking register PR4. As each word is shifted upward into the parking register the corresponding marker bit is shifted upward in the loop control register until the topmost stage (or stages) is (are) full.

Essentially the loop control opens the gates to shift data in Loop A until the top register PR1 receives the first found page. Loop B is then opened until the second page is found and shifted into parking register PR2. Loop C is then opened until the third page is found and loaded into parking register PR3. Since this is the capacity of the search register, reverse searching is initiated, employing Loop I since the top three registers are loaded.

If, in the reverse search a fourth word is found, the reverse shift is interrupted with one forward shift in Loop D to load the thus-found page in PR4 and reverse shifting is resumed. Reverse shifting now proceeds using Loop J until the head of the file resides in the last shift register position. Loop F is then opened to empty the parking registers into the top of the shift register and load the head of the file into the I/O station.

Specifically in FIGS. 3A to 3D the load control circuits consist of four paired flip-flop stages LC4, LC3, LC2, and LC1 comparable to the parking registers PR4, PR3, PR2 and PR1. Each of these consists of two bistable flip-flops connected by a two-line gate. A "0" or "1" bit is shifted into the stage from an external source, as for example, a lower stage in the cascade, and internally shifted within the stage by a shift pulse on line 804. A common reset line FS1 resets all of the flip-flops when forward shifting is instituted at the head of the stack.

Whenever a sought word is found at the I/O station a potential appears on line 818 to set flip-flop 308. If there is still room in the parking registers the "1" marking bit will be shifted into LC4 by means of gate 310 when the page is shifted into PR4.

Gate 310 is opened by AND 312 from inverter 314 and a timing pulse on line 802 which timing pulse also effects the interstage shift of data through the shift register memory. The input from inverter 312 is the output from AND 316 which has inputs from the "1" output side of loop control stage registers LC1, LC2, LC3, and LC4. Thus, if any one of these registers has a "0" marker bit (parking space available) AND 316 will yield no output, which when inverted in inverter 314 and ANDED with a timing pulse in AND 312 will open gate 310.

It should be noted that gate 310 will be opened for all combinations of bits in the registers except 111. Any one binary zero will open the gate. Once a bit is entered into LC4 it must be moved upward in synchronism with the progression of the corresponding found page through the parking registers. This is true of all marker bits. If, for example, three pages were initially found in immediate succession the three marker bits would move into LC1, LC2, and LC3 in the next four shifts following the detection of the first page.

Gate 318 must be similarly opened if any one of the stages LC3, LC2, or LC1 has a "0" marker bit. Its input from inverter 322 will occur if any one of the "1" output lines from LC1, LC2, or LC3 is not one (zero) to produce no output from AND 324. The opening of gate 318 does not necessarily mean that it will pass a binary one. It will pass whatever is in the preceding stage.

The gate 326 to stage LC2 when receive a marker bit from stage LC3 when AND 328 is opened by the timing pulse on line 802 only if inverter 330 receives no input from AND 332, which will occur if either LC1 or LC2 is not one. Finally, gate 334 will be opened to allow entry into LC1 only if LC1 is in a not one state as detected by inverter 338 and AND 336.

Each one of the paired flip-flops within the stages has zero and one input and output lines so that either bit may be shifted into, within, or out of each stage. The "1" outputs from the respective stages LC1 thru LC4 are identified by the reference numerals 340, 342, 344 and 346 respectively. The interstage lines are met otherwise identified.

By means of the circuits above traced, a one marker bit is generated by flip-flop 308 upon every match between a sought page in the search register and a page number at the I/O station. This marker bit is shifted through the loop control registers in synchronism with the shift of the corresponding page through the parking registers. Each shift in a shift register consists of an interstage shift pulse, line 802, and an intrastage shift, line 804. This line also resets the match flip-flop 308 so as not to enter a "1" marker bit on subsequent interstage shifts, unless of course, a match is found. Thus the "1" marker bits and found pages are moved upward until the registers are compacted with ones and "found" pages.

The marker bits in the loop control registers LC1, LC2, LC3, and LC4 are translated into loop control gate signals to effect the loop controls shown in Table 1 by interconnecting the "1" output lines 340, 342, 344 and 346 from the loop control registers in inverters 352, 354, 356, and 358 and in AND gates 360, 362, 364, 366.

As was previously stated the forward and reverse loops are symmetrical. This is also true of the controls. If for example, all load control registers are in the "1" state shifting will be effected in the forward and reverse directions in the E and J loops bypassing all of the parking registers.

Since pages are parked in the parking registers only during a forward shift, the marker bits are all moved in the load control registers only during a forward shift and then only if pages are being shifted through the parking register. Once entered in the load control registers, the marker bits remain there to control the loops until the pages are all moved to the head of the stack and a new forward search initiated. The marker bits are all reset to zero at that time.

The movement of the marker bits in the loop control registers is controlled by the gates 310, 318, 326, and 334. If these are open a marker bit from the next lower order (or from flip-flop 308) will be permitted to shift upward. The status of these gates can most easily be appreciated by reference to Table 2 which correlates the status of the load control registers with the status of the gates. A "1" denotes that a gate is open.

TABLE 2

| LC1 | LC2 | LC3 | LC4 | 334 | 326 | 318 | 310 |
|---|---|---|---|---|---|---|---|
| 0 | 0 | 0 | 0 | 1 | 1 | 1 | 1 |
| 0 | 0 | 0 | 1 | 1 | 1 | 1 | 1 |
| 0 | 0 | 1 | 0 | 1 | 1 | 1 | 1 |
| 0 | 0 | 1 | 1 | 1 | 1 | 1 | 1 |
| 0 | 1 | 0 | 0 | 1 | 1 | 1 | 1 |
| 0 | 1 | 0 | 1 | 1 | 1 | 1 | 1 |
| 0 | 1 | 1 | 0 | 1 | 1 | 1 | 1 |
| 0 | 1 | 1 | 1 | 1 | 1 | 1 | 1 |
| 1 | 0 | 0 | 0 | 0 | 1 | 1 | 1 |
| 1 | 0 | 0 | 1 | 0 | 1 | 1 | 1 |
| 1 | 0 | 1 | 0 | 0 | 1 | 1 | 1 |
| 1 | 0 | 1 | 1 | 0 | 1 | 1 | 1 |
| 1 | 1 | 0 | 0 | 0 | 0 | 1 | 1 |
| 1 | 1 | 0 | 1 | 0 | 0 | 1 | 1 |
| 1 | 1 | 1 | 0 | 0 | 0 | 0 | 1 |
| 1 | 1 | 1 | 1 | 0 | 0 | 0 | 0 |

A glance at the foregoing table reveals that all gates will be open to permit movement of the marker bits so long as LC1 remains in the zero state. When LC1 goes to "1" it closes gate 334 but allows the three lower order gates 326, 318, and 310 to remain open so long as LC2 remains in the "0" state. Register LC3 controls gates 318 and 310. When it goes to "1" gate 318 closes. Finally when LC4 goes to "0" gate 310 closes. In expected binary manner gate 334 and lower ones are open for eight of the combinations, gate 326 and lower gates are open for twelve combinations, gate 318 and lower gates are open for fourteen combinations, and gate 310 is open for fifteen of the combinations of marker bits that can exist in the loop control registers.

Since the load control registers must open the gates to shift page bits through the parking registers, their status must be translated to gate control potentials for the parking register gates on FIG. 2. Table 3 correlates the combinations of status of the load control registers with the output potentials from inverter 352 and AND gates 360, 362, 364, and 366.

TABLE 3

| LC1 | LC2 | LC3 | LC4 | 368 | 370 | 372 | 374 | 376 | Potential | Loop |
|---|---|---|---|---|---|---|---|---|---|---|
| 0 | 0 | 0 | 0 | 1 | 0 | 0 | 0 | 0 | A | F |
| 0 | 0 | 0 | 1 | 1 | 0 | 0 | 0 | 0 | A | F |
| 0 | 0 | 1 | 0 | 1 | 0 | 0 | 0 | 0 | A | F |
| 0 | 0 | 1 | 1 | 1 | 0 | 0 | 0 | 0 | A | F |
| 0 | 1 | 0 | 0 | 1 | 0 | 0 | 0 | 0 | A | F |
| 0 | 1 | 0 | 1 | 1 | 0 | 0 | 0 | 0 | A | F |
| 0 | 1 | 1 | 0 | 1 | 0 | 0 | 0 | 0 | A | F |
| 0 | 1 | 1 | 1 | 1 | 0 | 0 | 0 | 0 | A | F |
| 1 | 0 | 0 | 0 | 0 | 1 | 0 | 0 | 0 | B | G |
| 1 | 0 | 0 | 1 | 0 | 1 | 0 | 0 | 0 | B | G |
| 1 | 0 | 1 | 0 | 0 | 1 | 0 | 0 | 0 | B | G |
| 1 | 0 | 1 | 1 | 0 | 1 | 0 | 0 | 0 | B | G |
| 1 | 1 | 0 | 0 | 0 | 0 | 1 | 0 | 0 | C | H |
| 1 | 1 | 0 | 1 | 0 | 0 | 1 | 0 | 0 | C | H |
| 1 | 1 | 1 | 0 | 0 | 0 | 0 | 1 | 0 | D | I |
| 1 | 1 | 1 | 1 | 0 | 0 | 0 | 0 | 1 | E | J |

The similarity between Tables 2 and 3 is quite apparent. Loop A, for example, is active for eight of the combinations, B for four, C for 2, and D and E each for one to make up the sixteen combinations of the states of the load control registers.

Since Loop A requires the opening of gates 112, 116, 120, 124, 128, and 132 (FIG. 2) which gates, except for gates 128 and 132, are also opened for Loop B, intervening OR gates must be interposed between the lines 368, 370, 372, 374, and 376 to provide the requisite control potentials for those gates which are common to a plurality of loops. Therefore, in FIG. 3B the line 368 connects as an input to OR gates 378, 380, 382, and 384 which OR gates will, as will be seen in greater detail, connect respectively to open gates 124, 120, 116, and 112 (FIG. 2).

Additionally, since the forward and reverse loops are symmetrical and the controls provided by the loop control registers are the same, the control pulses must be split into two groups for the forward and reverse control. This is accomplished by separately gating the forward and reverse controls by means of AND gates 301, 303, 305, 307, 309, 321, 323, 325, and 327 for the forward shift loop controls, all of which are opened by a common gating pulse on line 802. The corresponding reverse AND gates are 311, 313, 315, 317, 319, 331, 333, 335 and 337 for the reverse loop controls the outputs from these AND gates for the forward direction are 101, 103, 105, 107, 109, 121, 123, 125, and 127 for forward loop control and 111, 113, 115, 117, 119, 131, 133, 135 and 137 for reverse loop control, all of which are cabled into cable 180 for exit and connection to the loop control gates on FIG. 2.

TYPICAL OPERATIONS

As a point of departure it will be assumed that the central processing unit 10 (FIG. 1) is manifesting its continuing need for pages from memory and the presence of a waiting list or queue of page numbers in computer storage by means of an enabling potential on line 11. So long as this line is potentialized, the CPU is requesting the memory to search for requested pages in the queue and deliver them to the CPU when found.

Figure 6D:
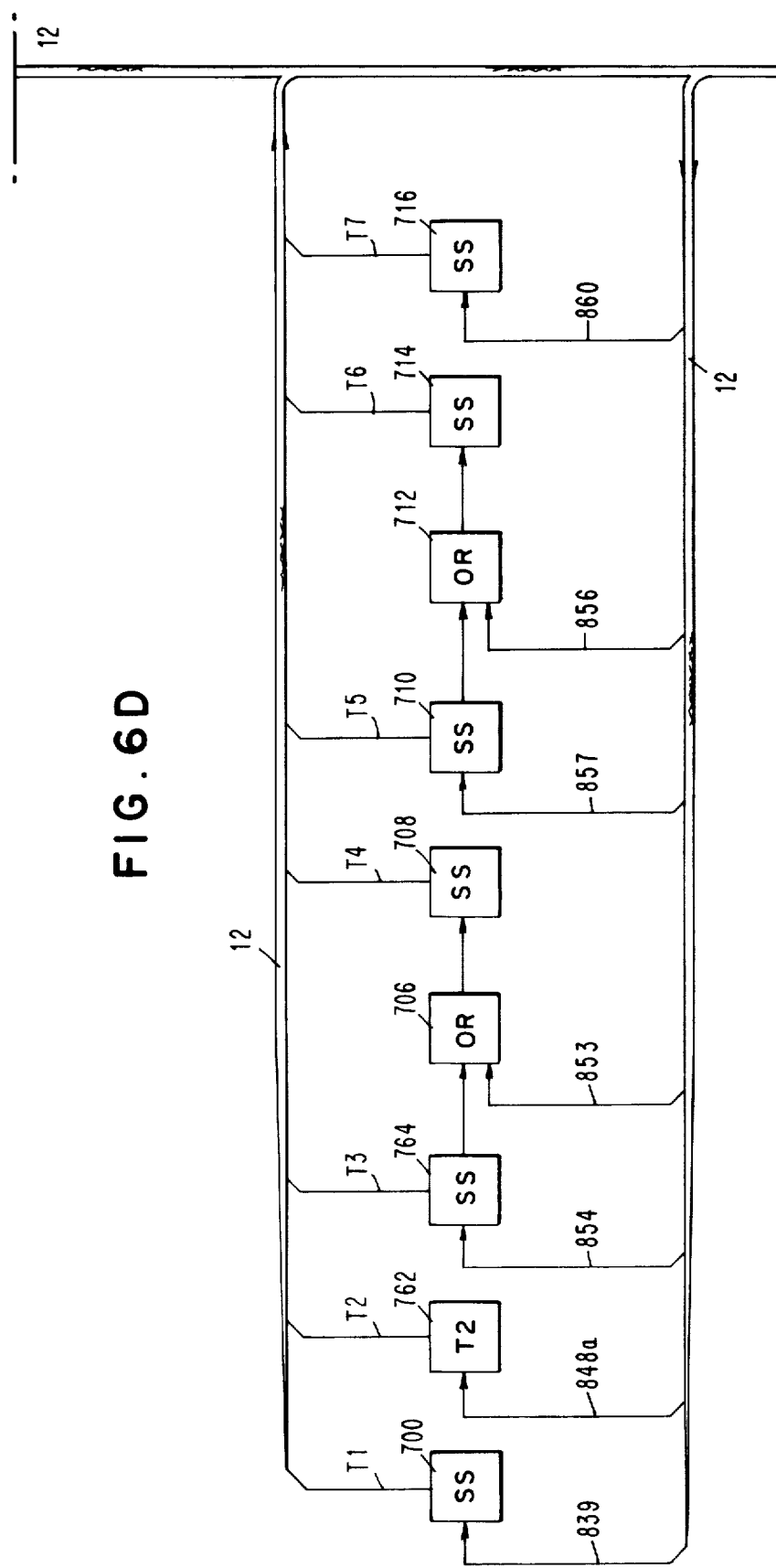
FIG. 6, consisting of FIGS. 6A through 6D, shows the timing circuitry.
Figure 6:
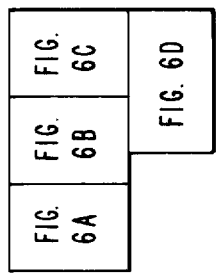
Figure 6A:
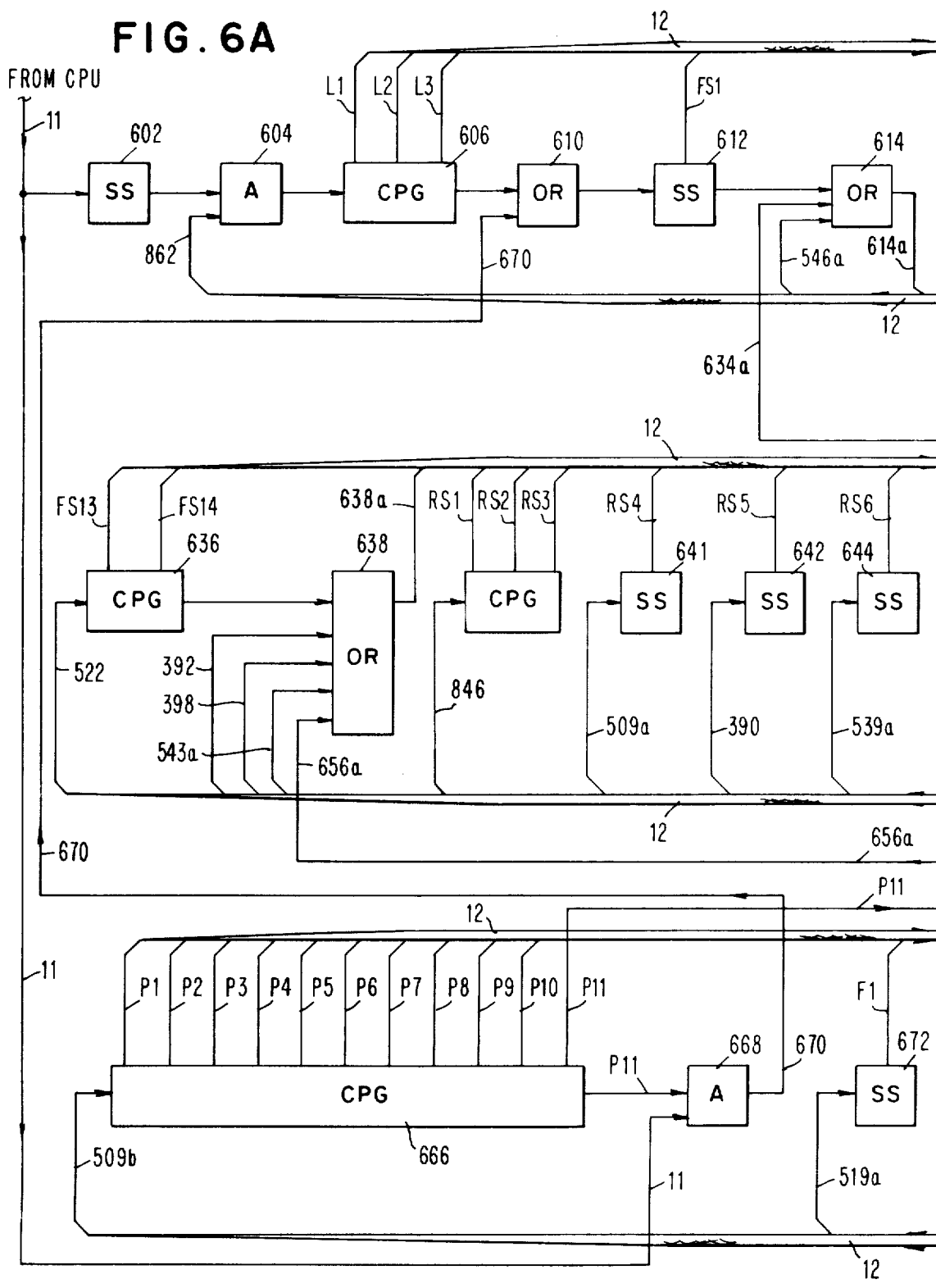
Figure 6B:
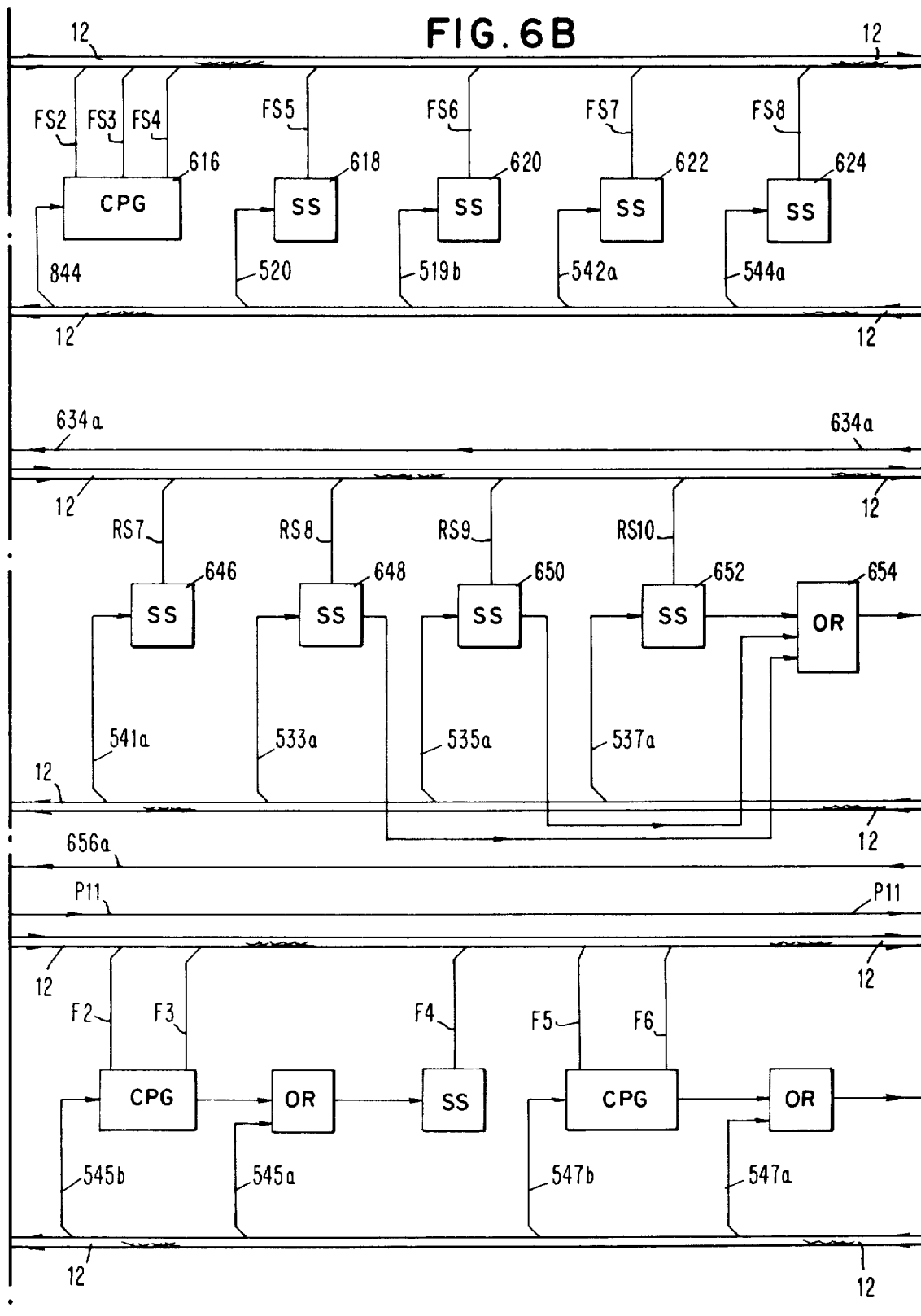
Figure 6C:
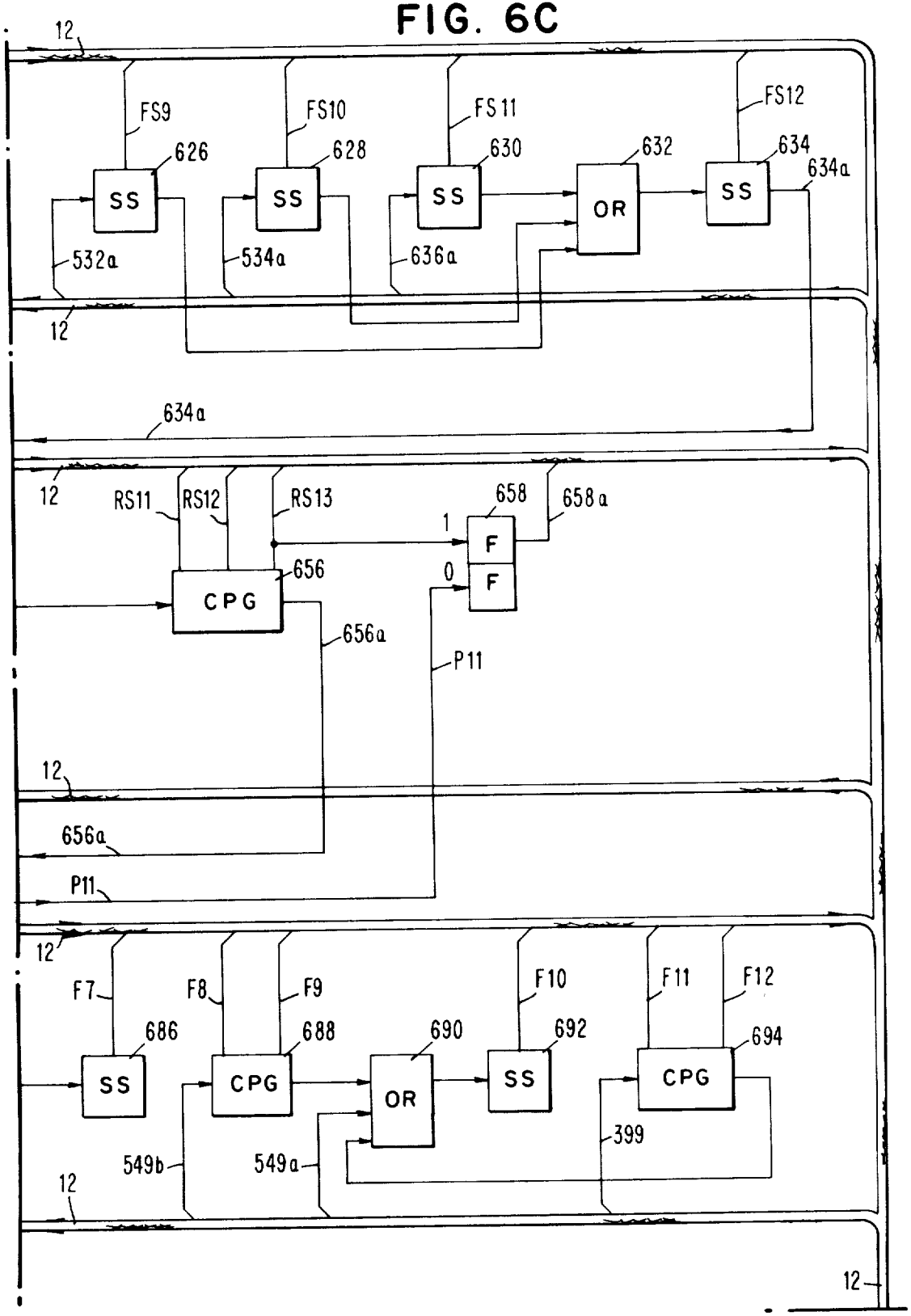
Figure 7D:
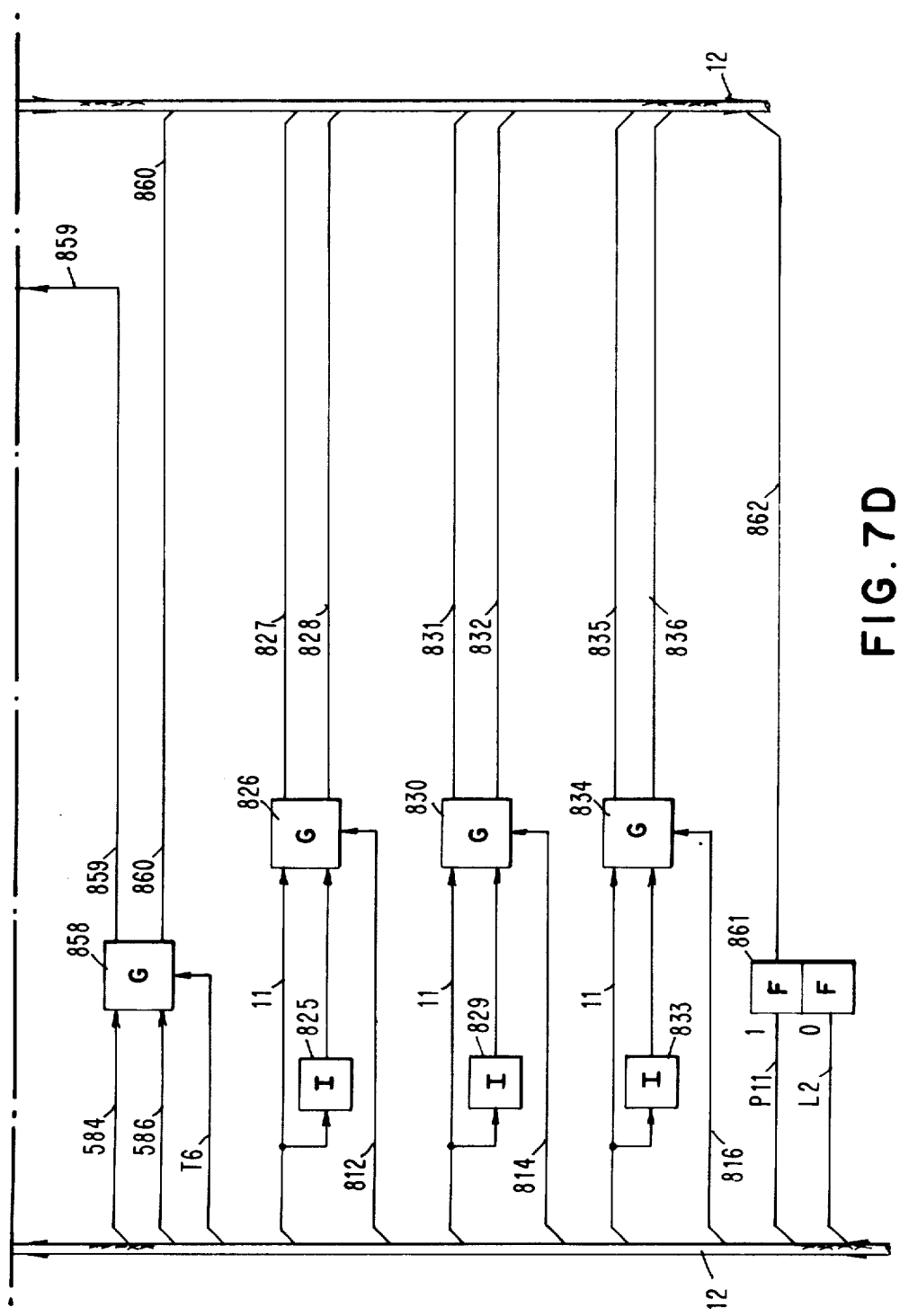
FIG. 7, consisting of FIGS. 7A through 7D shows the control logic activated by the timing.

The potential on line 11 is delivered via cable 12 to the timing and control circuits of FIG. 6 and the logic circuits of FIG. 7. In FIG. 6A if idling flip-flop 861 (FIG. 7D) is set to potentialize line 862, AND 604 (FIG. 6A) will be activated when the onset of a potential on line 11 fires SS602 to initiate the series of timing pulses L1, L2, and L3 from CPG 606.

Pulse L1 operates OR 805 to potentialize line 806 (FIG. 7B) which signals the CPU that a page is being extracted from the CPU and loaded into the search register. The L1 pulse also operates OR 811 to potentialize the line 812, which on FIG. 5A opens gate 502 to gate the first page in the CPU's queue to SR1.

Line 812 (on FIG. 7C) also tests for the presence of a potential on line 11 by opening gate 826 to enter line 11 or not line 11 (via inverter 825) to lines 827 or 828, respectively. These set or reset the page present flip-flop 508C (FIG. 5A). If the CPU has no page in its queue, line 11 will be dead and a page 0 will be entered into the search register. Obviously, no search will be performed for this page. The page present flip-flop keeps track of empty pages. The L1 pulse through OR 811 resets the marker bit to zero in register 568a.

The L1 pulse is followed by L2 which performs the same functions with respect to SR2 as follows:

1. Signals CPU it is extracting a page by means of OR 805 and line 806.
2. Operates OR 813 and line 814 to open gate 504 to enter a page number in SR2.
3. Tests for potential on line 11 by using line 814 to open gate 820 to test line 11 for potential (line 831 hot) or no potential (by means of inverter 829) to potentialize line 832, setting or resetting flip-flop 510C accordingly.
4. Resets marker bit in register 510A to zero.

Pulse L3 performs a corresponding function with respect to SR3 by means of OR 815 and line 816 which controls the page entry by means of gate 506, resetting marker bit to zero in register 512a and testing the line 11 for potential (gate 834, inverter 833) to energize line 835 or 836 to set or reset page present register 512c.

Every page entry enters either a valid page number or page zero into the appropriate search register. The page present flip-flop manifests the presence or absence of a valid page number and is checked every entry.

Upon cessation of L3, OR 610 fires single shot 612 to produce the FS1 pulse the FS1 pulse resets the load control registers LC1, LC2, LC3, and LC4 (FIGS. 3A and 3B) by potentializing the FS1 line. The FS1 pulse also sets the marker bits in registers 508a, 510a, and 512a to "1" if the corresponding page present registers 208c, 510c, and 512c manifest the presence of a valid page number. Accordingly, the FS1 pulse is "ANDED" respectively with the valid page lines 576 (in AND 558), 580 (in AND 560) and 584 (in AND 562). If any of the search registers has a zero page number, the marker bit will register zero. This causes the search to reverse when the pages existing at the head of the stack have all been found.

Cessation of the FS1 pulse operates OR 614 to initiate a test sub-routine to ascertain if any of the search registers is loaded with an invalid page number (i.e., zero) and if the CPU has a new page number in its queue. Therefore, line 641a connects on FIG. 7C to OR 838 and line 839 to fire SS700 (FIG. 7C) to produce the T1 pulse. Line 614a also sets the forward flip-flop 840 (FIG. 7C) so that the test cycle which is common to both forward and reverse shifts can return to the primary cycle from which it departed.

The T1 pulse opens gate 848 (FIG. 7C) to test for a potential on line 11 and the presence of one or more invalid entries in the search registers. The "0" output from page present registers 508c, 510c, and 512c, respectively, lines 578, 582, and 586 are "ORed" in OR 851, "ANDed" with line 11 in AND 850 and the output inverted in inverter 849 and listed by means of gate 848 to produce a "0" on line 11 hot output on line 848a or the inverse to OR 847. If the inverse is present, the "1" status of direction flip-flop 840 will, via line 841 and AND 843, potentialize line 844 to initiate FS2.

If the test shows at least one invalid page entry and the CPU with an available page (line 11 hot), line 848a will fire SS702 (FIG. 6D) to yield the T2 pulse. On FIG. 7C the T2 pulse opens gate 852 to test SR1 for a valid page (line 576 hot) or invalid page number (line 578 hot). If line 576 is hot, line 853 operates OR 706 to fire SS708 to pass the test to SR2. If SR1 has an invalid entry, as it never would on startup, line 854 fires SS704 to yield the T3 pulse. The T3 pulse connects to OR 811 to produce the potential on line 812 to effect the entry and control functions previously described. The page register will be converted to a "1," and the marker bit will be reset to "0." It is assumed that this test and reentry cycle will be ineffective upon initial startup as the probability of the CPU having only one page in its queue upon startup is not very likely. If it should occur, the "0" marker bit may cause one premature search reversal but will not cause an error.

The T3 pulse cessation opens OR 706 as did the SR1 valid page number line 853 to produce T4. This pulse tests SR1 for the presence of a page by means of gate 855 and lines 580 and 582 from 510c with outputs on 856 and 857 respectively. Line 856 via OR712 fires SS714 to produce the T6. An invalid page entry (line 857 hot) fires SS710 to produce the T5 pulse.

The T5 connects to OR 813 to energize line 814 for the entry and control functions described with respect to L2 and SR2. Cessation of T5 produces T6 via OR 712 and SS714.

The T6 pulse tests SR3 for a "0" by opening gate 858 to gate either the line 584 (valid) or 586 (invalid) from 512c to lines 859 or 860 respectively.

Line 859 (valid) returns control to either the forward or reverse search cycles by means of OR 847 and the potential of line 841 (forward) or 852 (reverse) and either AND 843 or AND 845. Line 344 initiates FS2. Line 846 initiates RS1.

If SR3 had a "0" bit, line 860 would fire SS716 to produce the T7. This activates OR 815 to energize line 816 for the entry and control functions described with respect to L3 and SR3. The register 512c will have a valid page bit ("1") and the marker bit will equal zero.

This test and entry cycle is effected during both the forward and reverse search operations after every shift of a new page into the input/output station and comparison thereof with the search registers. If the CPU becomes active after a dormant period, it will make any pages it has in its queue available to the search registers as soon as a vacancy occurs.

Reentry into the forward search routine from line 844 fires CPG 616 to yield the FS2 pulse. This is the interstage data shift pulse that shifts data between stages in the shift register memory and in the parking registers (if they are not full) and also shifts the marker bits into and through the load control registers. To effect this, the FS2 pulse affects OR801 to produce a pulse on line 802 to shift register 102 (FIG. 2) to shift the data forward between stages. It is also applied to the 802 line on FIG. 3B to open all of the forward AND gates 301, 303, 305, 308, 309, 321, 323, 325, and 327 to any gating pulses passed by the loop control logic. The 805 (FS2) pulse also opens AND gates 312, 320, 328, and 336 to pass a marker bit within the loop control registers. Finally, the 802 pusle advances the shift counter 503 by one count.

Since it is assumed that this is a startup operation, there will be no matches. The first shift pulse (FS2) will therefore shift page zero into the parking register PR4. The zero page is the head of the stack and will never compare against any of the search register entries. This first shift advances the shift register counter to one as hereinabove described. The shift counter is incremented for a forward shift and decremented for a reverse.

The FS2 pulse is followed by the FS3 and FS4 pulses in CPG 616. The FS3 pulse provides an internal or intrastage shift of bits in the shift register memory 102, in the I/O station, in the parking registers, and in the load control registers. This internal shift is invariably applied even through a new bit may not have been shifted into a parking register or load control register. It applies to all forward and reverse shifts, as a bit flows in the same direction within a stage independent of the interstage direction. The FS33 pulse also resets match flip-flop 308 (FIG. 3A) to condition it to store a match on the next-occurring comparison. The FS3 pulse, and others, activate OR 803 (FIG. 8) to potentialize line 804 for the internal shift.

The FS4 pulse follows the FS3 and operates to test the marker bits in the shift register for all zeros, or the lack of any ones. Searching continues in the forward direction until all of the page numbers in the search registers at the top of the stack (as marked by ones) have been found. On FIG. 3C the FS4 pulse opens gate 516 to gate the output from OR 514 which connects to the "1" output lines 508d, 510d, 512d of the marker bit registers. Thus if any one of the registers still contains a "1" OR514 will yield in output on line 520 to continue the forward searching. Line 522 will be potentialized if the marker bits are all zero at FS4 time. Line 520 is connects in FIG. 6 to single shot 618 to yield the FS5 pulse. This timing pulse opens gate 519 (FIG. 3c) to produce a maximum count signal on line 519a or no maximum on line 519b from the shift counter 503. The 519a line connects in FIG. 6 to fire single shot 620 to produce the FS6 pulse.

The FS6 pulse (by means of OR819 and line 820) tests the search register SR1 for a match with the page number at the I/O station by opening gate 524, via line 820, to enter the page number in the comparator 530 and opens gates 532 and 542 to test the equality or inequality. An inequality on line 542a fires SS622 to produce the FS7 pulse.

The FS7 (by means of OR821 and Line 822) pulse tests search register SR2 for a match by opening gates 526, 534 and 544. A no-match signal on line 544a fires SS624 to produce the FS8 pulse for testing search register SR3 in the manner of the two previous tests. If there is a mismatch of register SR3 at FS8 time, line 546a will be potentialized to activate OR614 and produce a repetition of the FS2, FS3, and FS4 pulses in CPG616.

If at FS6 time SR1 matched the page number at the I/O station, line 532a would have been potentialized to fire SS626 to produce the FS9 pulse. This pulse signals the CPU via OR805 and line 806 and opens gate 502 (via OR811 and line 812) to enter the new page number. It also sets the marker bit to zero in register 508a. OR811 responds to five timing pulses to yield the control. As previously explained, any page entry can cause a blank page number to be entered in the search register. The operation described for page entry into SR1 at L1 time would be the same for entry at FS9 time. An invalid page number would reset register 508c to zero.

The replacement of a "found" page in SR2 occurs at FS10 time in the same manner Gate 524 effects the entry. The register SR3 is reloaded at FS11 time by means of OR815, line 816, OR558 and gate 506. The single shots 626, 628, and 630 provide the FS9, FS10, and FS11 pulses when fired by the respective match lines 532a, 534a or 536a.

A match of any one of the registers SR1, SR2, or SR3 must be accompanied by a readout of the page then at the I/O station and by a SS634 to produce the FS12 pulse. This pulse opens gate 79 (FIG. 1) to gate the page data to the CPU. It also sets match flip-flop 608 to the "1" state for entry into the loop register upon the next shift. Cessation of FS12 returns the cycle to the test cycle T1 through T6 previously described by means of OR 614. FS12 produces this control by means of line 634a.

The first found page is shifted from the I/O station to PR4 at FS2 time while the next following page shifts into the I/O station. Concurrent therewith the "1" marker bit is shifted into loop control register LC4. The FS 3 pulse causes an internal shift within each shift register stage and within the loop control register stages. It also resets the match flip-flop 608.

The cycle of FS2 through FS8 repeats until a second match is found. Meanwhile the successive interstage shifting moved the first-found page from PR4 to PR3 to PR] and finally to PR1, while the "1" marker bit was moving from LC4 to LC3 to LC2 and finally to LC1.

With a "1" bit in LC1, inverter 352 will yield no output to shut off AND 301 to prevent shifting the first-found page out of PR4, which will now be by-passed. The "1" in LC1 combined with a "0" in LC2 opens AND 360 to provide a "B" gating pulse to the parking registers as shown in Table 1.

When the second match is found at FS5, FS6, or FS7 time and the page replaced with an appended "0" marker bit in the search register, the page is read out to the CPU, the match flip-flop set and the second-found page shifted into PR4 and the marker bit into LC4. Successive shifts move the page and marker bit to PR2 and LC2 where the loop shifts to the C loop so as to park the page. The third page is similarly found and shifted into PR4 while its marker bit is moved to LC4. This occurs at FS2 following an FS12 control with an intervening test cycle. Now, however, when the marker bits are tested at FS4 time, OR 514 yields no output to potentialize line 522 and produce the FS13 and FS14 pulses in CPG 636. These pulses move the third-found page from PR4 to PR3 and the marker bit to LC4. This insures that the parked data is fully compacted before reverse feed begins.

Reverse searching begins after the test cycle previously described. Cessation of FS14 operates OR 638 to initiate the test cycle. Upon completion, line 844 fires the first of three single shots in CPG 640 to produce successive RS1, RS2, and RS3 pulses. The RS1 pulse (by means of OR807 and line 808) decrements the shift counter 503, applies a reverse shift pulse to shift register 102 and activates all of the AND gates 311, 313, 315, 317, 319, 331, 333, 335 and 337 to pass the reverse gating pulses to the parking register gates. Since three pages have been found and parked during the forward search, reverse Loop I will be activated so that only SR102, PR4, and the I/O station will be in the loop. There is never any reverse movement of the marker in the load control registers. The three one-marker bits remain in LC1, LC2, and LC3 and operate to control the reverse loop gates as heretofore explained with respect to the tables.

The RS2 pulse operate OR803 to provide the internal shift control on line line 804 for memory, the parking registers and the load control registers. Following immediately, without intervening logic, RS3 opens gate 509 (FIG. 3c) to test for a count of five in the shift counter 503. If it is a five, line 509b will be potentialized. No five potentializes line 509a.

It will be assumed that the feed has just reversed and the position of the data in the shift register is not within five positions of the head of the stack and that there is still one parking register available. Therefore the "not five" line 509a, potentialized at RS3 time, fires SS641 to yield the RS4 pulse. This opens gate 386 (FIG. 3B) to test AND366 for all 1's (parking registers full) or not all 1's/via inverter 388/ to produce an output on line 392 (full) or 390 (not full). Since it is assumed there is room line 390 is potentialized to fire SS642 to produce the RS5 pulse. The full condition will be treated subsequently.

Since it has been assumed that there is still one parking space left and the head of the file has not been approached (shift register counter greater than five), the RS5, RS6, and RS7 pulses will be operative to sequentially test the search registers SR1, SR2, and SR3 for a match with the I/O station. Gate 524 is opened by line 820 (from OR819) when RS5 is active to open gates 533 and 539 to enter the page number from SR1 into comparator 530 and gate the equal or not equal pulses. A not equal test at RS5 time initiates RS6, and a not equal at RS6 initiates RS7 in the manner of the sequence of pulses FS6, FS7, and FS8 during a forward search. A succession of three no matches produces a final output at RS7 on line 543a which reinitiates the reverse search cycle at RS1 time by means of OR638. This loop continues until a match is found or the shift counter to equal five when tested at RS3 time. This condition occurs if all of the pages in the search registers reside in position in the file beyond the turnaround point or are not in the file.

If any one of the search registers equals the I/O station then the cycle diverts to RS8, RS9, or RS10 to replace the found page number in the search register, signalling the CPU on line 806. The RS8, RS9, and RS10 pulses, since they perform the same functions as their counterpart forward pulses FS9, FS10, and FS11 are therefore respectively "ORed" with these pulses in OR811, OR813, and OR815 to produce the replacement controls for SR1, SR2, and SR3 respectively. Upon termination of any of these pulses, OR654 operates to fire SS656 to produce the RS11 pulse. RS11, like FS12, operates OR817 and line 818 to open gate 79 (FIG. 1) to gate the I/O station data to the CPU and sets a "1" into match flip-flop 308 (FIG. 3A).

The thus-found page must now be parked in parking register PR4. Cessation of RS11 fires CPG658 to produce RS12 and RS13 which provide a forward interstage shift pulse, accompanied by a counter increment and an intrastage shift pulse, accompanied by a match flip-flop reset. The RS12 pulse operates OR801 for the first function and the RS13 operates OR803 for the second function.

The parking registers are now full and reverse shifting without comparison should now ensue, so as to promote the four found pages to the head of the file. Reverse shifting in the "J" loop (see Table 1) proceeds until the page zero occupies the last position in the shift register memory. This corresponds to a count of five in the shift register counter. Therefore, upon cessation of RS13 line 656a via OR 638 to produce the succession of RS1, RS2, and RS3. As heretofore described the RS1 pulse produces a reverse shift and decrements the shift counter RS2 produces the internal shift and resets the match flip-flop. At RS3 time the shift counter is tested for five as previously described. For the moment it will be assumed to be non-five so that line 509a is not to fire single shot 641, yielding an RS4 pulse.

Testing of the load control registers at RS4 by means of gate 386 produces a "full" indication on line 392 which reinitiates RS1 by means of OR638. The shift and testing of the shift counter is repeated until the test at RS3 produce an "=5" sequel on line 509b.

Line 509b activates clock pulse generator 666 to produce parking pulses P1 through P11 in unintercepted succession. The odd numbered ones (except P11) of these provide a reverse interstage shift of data and the even ones an intrastage shift for a total of five shifts. During these shifts the four found pages are moved out of the parking registers into the I/O station and shift register memory followed by page zero and four blank page positions. During these five shifts loop "F" must be activated. Normally, except for this special condition the loop control registers would bypass the parking registers. To prevent this when it is desired to empty the parking registers, RS13 sets the parking flip-flop 658 to a "1" thus potentializing line 658a, which on FIG. 3A, operates inhibit gate 659 to make the binary "1" in LC1 appear as a binary "0" to the loop control logic. Reference to Table 3 reveals that the register combintions with LC1=0 all produce either an "A" or an "F" loop control. The five data shift pulses P1, P3, P5 and P7 all connect to OR807 to potentialize line 808 so as to activate AND311, AND331, AND333, AND335 and AND337 to potentialize lines 111, 131, 133, 135, and 137, thus opening gates 130, 134, 138, 142, 146 and 150 to path "F". This loop persists for the duration of the promotion sub-cycle.

Upon cessation of P11, page zero is at the 1/0 station and the top four stages of the shift register memory contain the last four "found" pages. The search registers may or may not contain the numbers of valid pages which are still being sought. If they do, line 11 will be hot. If not line 11 will be deactivated. Therefore P11 is combined in AND668 with he potential on line 11 to produce a restart pulse on line 670. OR610 receives this pulse to initiate a forward search at FS1 time, the search proceeding as previously described.

If line 11 were dead, line 670 would not have started the forward search. The memory system would therefor wait for repotentialization of line 11 to enter the load sub-cycle at L1 time to reactivate the search.

To prevent the reactivation of line 11 from initiating the L1 timing pulse in conflict with other controls, the cessation of P11 sets flip-flop 861 (FIG. 7C). It is reset at L2 time. Thus, the load cycle L1, L2, and L3 can only proceed after full completion of all T cycles. Individual test and load cycles as previously described with respect to the tijing pulses T1 through T7 can occur at the beginning of the forward or reverse search cycles.

The foregoing description assumed that all of the three pages resident in the search registers at the beginning of the forward search resided in memory and were found and read out to the CPU. This is detected by the changing of the marker bit in each search register from a "1" to "0" when the page is found and a new page number inserted. However, one or more pages may be absent from the memory. The controls would search the whole file without success. This assumes a non-zero page number not present in memory.

Therefore, the shift counter 503, when the bottom of the file is reached, potentializes line 503n. If the counter were an n bit counder and these were 2n memory words the 503n line would be the output of the next following counter stage. When tested at FS5 time, gate 519 will yield on output on line 519a to initiate a fault cycle by firing SS672 to produce an F1 pulse. It and the following pulses successively test the marker bit registers for the presence of 1's. Any "1" marked page number is read back to the CPU and a new page substituted therefor. All the faulting pages are thus removed.

Specifically, pulse F1 opens gate 545 (FIG. 5) to produce a "1" response on line 545b or "no-one" on line 545a. A "no-one" on line 545a, via OR678, fires SS680, to produce the F4 pulse for testing marker register 510a by means of gate 547. A "no-one" response on line 547a moves the test to the third register, via OR684, SS686, F7 and gate 549. A "not-one" response on line 549a fires SS692 to produce the F10 pulse. This and the next two pulses test the data for compaction before initiating a reverse search. Since the forward search may have found none, one or two of the sought pages, it is necessary that any found pages be stored in parking registers PR1 or PR1 and PR2. Therefore F10 opens gate 397 (FIG. 3B) to produce a "compact" signal on line 398 on "not-compact" signal on line 399.

The data is not properly compacted if LC1, LC2, LC3, and LC4 contain any one of the following combinations of binary bits

| LC1 | 0 | 0 | 0 | 0 | 0 | 0 | 1 | 1 | 0 | 1 | 1 |
| LC2 | 1 | 1 | 1 | 1 | 0 | 0 | 0 | 0 | 0 | 0 | 1 |
| LC3 | 0 | 0 | 1 | 1 | 1 | 1 | 1 | 1 | 0 | 0 | 0 |
| LC4 | 0 | 1 | 0 | 1 | 0 | 1 | 0 | 1 | 1 | 1 | 1 |

The first group of four combinations have LC1=0 and LC2=1 in common. The second group has LC2=0 and LC3=1 in common. The third group has LC3=0 and LC4=1 in common.

The remaining combinations

| LC1 | 0 | 1 | 1 | 1 | 1 |
| LC2 | 0 | 0 | 1 | 1 | 1 |
| LC3 | 0 | 0 | 0 | 1 | 1 |
| LC4 | 0 | 0 | 0 | 0 | 0 | represent compacted data combinations where no vacent register exists above a full register. Therefore in FIG. 3B the three different combinations are detected in the three AND gates 393, 394, and 395 where the first detects LC1=0 and LC2=1, the second LC2=0 and LC3=1 and the third CL3=0 and LC4=1. None of the compacted combinations will satisfy these relationships.

These combinations are tested at F10 time by means of the gate 397 which produces a "compacted" output on line 398 or "not compacted" output on line 399 by means of the inverter and OR397.

A "not-compact" output on line 399 operates CPG694 to produce F11 and F12 pulses which, by means of OR801 and OR803, produce the interstage forward shift pulse (also incrementing the shift counter), tne the intrastage shift pulse. Cessation of F12 returns control to F10 by means of OR690 to again test for compaction. This continues until the data is compacted and line 398 potentialized to initiate a reverse search by potentializing OR638.

If any one of the search registers had registered a "1" a new age would have been requested from the CPU. At F1 time line 545b would initiate the F2 and F3 pulses in CPG674. The F2 pulse opens gate 701 to gate the page number from SR1 to the CPU via cable 21, followed by a replacement by means of gate 502 opened by line 812, via OR548 and OR811 initiated by F3.

Cessation of F3 operates OR678 to produce the F4 pulse (via OR678). If F4 test SR2 for a "1" (line 547b hot) then F5 and F6 will read the faulting page number to the CPU and read in a new number. Pulses F8 and F9 will do the same for the third register if necessary. All new entries reset the marker bits to zero via lines 812, 814, or 816 these being potentialized from OR811, OR813 and OR815 respectively which control the loading of SR1, SR2, and SR3 respctively and the setting of the marker bits to zero.

In addition to the idling which may occur at the end of P11 if line 11 is not potentialized, the setting of the marker bits to "1" only if there is a valid page number in the search registers will cause the apparatus to search only one page deep into the file if all search registers have a zero page number. As soon as the search resisters are tested and found to have all zeros, the reverse search operation will be initiated. This alternation between forwward and reverse searches will continue until line 1 becomes hot and the CPU delivers a new and valid page for search.

REVIEW OF OPERATION

From the foregoing description it will be seen that a plurality of page numbers are initially entered into the search registers when the head of the file (page zero) occupies the I/O station. They are marked with a "1" marker bit. The control circuits shift all of the pages in memory through the I/O station comparing each successive page number at the I/O station with the plurality of page numbers in the search registers. When a sought page number is found, the page is read out of the 1/0 station to the CPU and a new page number substituted in the search register and marked with a "0" marker bit. All page numbers entered into the search register at a shift position other than that wherein the head of the file (page zero) occupies the 10 station I/O marked with a zero.

Searching in a forward direction continues until all "1"-marked page numbers are found, or until the whole file has been searched. Reverse searching is then initiated for those page numbers added to the search register during the forward search.

Whenever one of the page numbers in the search register matches that in the I/O station the page in storage is read to the CPU, the stored page is moved into a parking register, and a new page number substituted in the search register.

Reverse searching continues until the parking registers are full or until the head of the file is neared so that the pages parked in the parking registers may be inserted just behind the head of the file, or zero page.

While in the embodiment illustrated three search registers and four parking registers were described, it is obvious that other prameters may be chosen without departing from the principle of the invention, so long as there are a plurality of each. The underlying principle governing the search operation is that searching is performed during both the forward and reverse shifting of the shift register memory for a plurality of sought pages, that reversal of the shift direction occurs when all of the pages sought when the shift position is at the head of the file have been found, and that the pages when found are moved to a position at the head of the file.

What is claimed is:

1. In a memory management system for a serial shift register type of memory having at least one station through which successive pages of date, including a page number, may be bidirectionally shifted for sensing of the data and operative to reorder the sequence of the stored pages to group the most recently accessed pages at the head of the file, the improvement comprising:
   a. register means for storing a plurality of page numbers for search;
   b. means operative when the head of the file resides at said station for initiating a data shift in a first direction through said shift register memory and for marking the page numbers in said register means with a first significant indicia;
   c. means operative to compare said stored page numbers with each of the page numbers as they are shifted in either direction through said station and producing an equality signal upon a match;
   d. means operative responsive to said equality signal for replacing the matching page number in said register and marking the replacement with a second significant indicia;
   e. means operative responsive to the presence of all said second indicia in said register for reversing the direction of search;
   f. means operative responsive to each of said equality signals for diverting the pages in said shift register memory whose page numbers matched those in said register means from a main shifting path into a parking means; and
   g. means operative to reinsert the parked pages from said parking means into the main shifting path when the head of the file is proximate said station.

2. In the data management system of claim 1 the parking means comprises a plurality of shift register stages interconnected by gates wuch that a recirculating loop can be connected to include none, all or intervening numbers of stages.

3. In the system of claim 2 wherein the said parking means is serially disposed between said station and the last stage in the shift register memory.

4. In the system of claim 2 wherein each of the parking stages has connected thereto a pair of input gates and a pair of output gates, one gate of each pair being connected to the last stage in the shift register memory and the remaining gate of each pair being connected to an adjacent stage in the loop including each of the parking stages, the said station, and the shift register memory.

5. In the system of claim 1 wherein there is additionally provided a counter which is incremented for a shift of data through said shift register memory in said first direction and decremented when shifting is effected in the second direction, the said counter being operative to manifest a zero count when the head of the file occupies said station.

6. In the system of claim 5 the said zero count manifestation of said counter is operative to change the indicia in said register from the second to the first significance.

7. In the system of claim 5 the said counter is additionally provided with a signalling means at a count equal to one plus the number of stages in the parking means.

8. In the system of claim 7 the said signalling means is operative during reverse shifting to empty the parking means.

* * * * *